United States Patent
Madison et al.

(10) Patent No.: US 10,648,413 B2
(45) Date of Patent: *May 12, 2020

(54) METHOD FOR DETERMINING A DILUTION OF RECIRCULATED GASES IN A SPLIT EXHAUST ENGINE

(71) Applicant: Ford Global Technologies, LLC, Dearborn, MI (US)

(72) Inventors: Daniel Madison, Dearborn, MI (US); Joseph Ulrey, St. Joseph, MI (US); Gopichandra Surnilla, West Bloomfield, MI (US); Mohannad Hakeem, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/926,970

(22) Filed: Mar. 20, 2018

(65) Prior Publication Data

US 2019/0293010 A1 Sep. 26, 2019

(51) Int. Cl.
| | | |
|---|---|---|
| F02D 41/00 | (2006.01) | |
| F02M 26/07 | (2016.01) | |
| F02D 13/02 | (2006.01) | |
| F01N 13/10 | (2010.01) | |

(52) U.S. Cl.
CPC ....... *F02D 41/0072* (2013.01); *F01N 13/107* (2013.01); *F02D 13/0215* (2013.01); *F02D 13/0257* (2013.01); *F02D 41/0077* (2013.01); *F02M 26/07* (2016.02); *F02D 2041/0067* (2013.01)

(58) Field of Classification Search
CPC .. F02D 41/0052; F02D 41/0077; F02D 41/04; F02D 13/0249; F02D 13/0257; F02D 2041/0067; F02M 26/07; F01N 13/107
See application file for complete search history.

(56) References Cited

U.S. PATENT DOCUMENTS

| | | | | |
|---|---|---|---|---|
| 4,462,376 A | * | 7/1984 | Ripper | ................ F02D 41/005 123/676 |
| 2014/0190458 A1 | * | 7/2014 | Gingrich | ................ F02B 47/08 123/568.2 |
| 2015/0316005 A1 | * | 11/2015 | Madison | ................ F02M 26/04 60/602 |
| 2018/0171883 A1 | | 6/2018 | Ulrey et al. | |

OTHER PUBLICATIONS

Surnilla, G. et al., "Method for Determining a Dilution of Recirculated Gases in a Split Exhaust Engine," U.S. Appl. No. 15/926,940, filed Mar. 20, 2018, 72 pages.

* cited by examiner

*Primary Examiner* — Brandon D Lee
(74) *Attorney, Agent, or Firm* — Geoffrey Brumbaugh; McCoy Russell LLP

(57) ABSTRACT

Methods and systems are provided for determining a dilution of recirculated gases, including blowthrough air, combusted exhaust gas, and fuel vapor, in a split exhaust engine. In one example, the dilution rate may be calculated using a steady state model based on temperature measurements from an intake region of the engine. The steady state model may be further used in combination with a feedforward model adapted to estimate engine dilution during engine transients as a correction factor.

18 Claims, 8 Drawing Sheets

METHOD FOR DETERMINING A DILUTION OF RECIRCULATED GASES IN A SPLIT EXHAUST ENGINE

FIELD

The present description relates generally to methods and systems for determining a dilution value or rate of recirculated gases in a split exhaust engine operating with blowthrough.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that utilizing an engine system with a split exhaust system, where a first exhaust manifold routes exhaust gas recirculation (EGR) to an intake of the engine, upstream of a compressor of the turbocharger, and where a second exhaust manifold routes exhaust to a turbine of the turbocharger in an exhaust of the engine, may decrease knock and increase engine efficiency. In such an engine system, each cylinder may include two intake valves and two exhaust valves, where a first set of cylinder exhaust valves (e.g., blowdown exhaust valves) exclusively coupled to the first exhaust manifold may be operated at a different timing than a second set of cylinder exhaust valves (e.g., scavenge exhaust valves) exclusively coupled to the second exhaust manifold, thereby isolating a blowdown portion and scavenging portion of exhaust gases. The timing of the second set of cylinder exhaust valves may also be coordinated with a timing of cylinder intake valves to create a positive valve overlap period where fresh intake air (or a mixture of fresh intake air and EGR), referred to as blowthrough, may flow through the cylinders and back to the intake, upstream of the compressor, via an EGR passage coupled to the first exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while improving the turbine's work efficiency and engine torque.

However, the inventors herein have recognized potential issues with such systems. As one example, in the engine system described above, a composition of gas recirculated to the intake may be more complex than a traditional EGR system comprising a single exhaust manifold or a system that does not recirculate increased volumes of blowthrough air. Whereas recirculated gas in traditional EGR systems is entirely comprised of burnt gas, the gas recirculated through the split exhaust engine may include varying portions of burnt gas, fresh air, and pushback (e.g., unburnt or non-combusted) fuel. Timing adjustment of engine operations such as fuel injection, spark advance, and intake and exhaust valve actuation timings based on an assumed EGR gas composition of traditional EGR systems may result in degraded engine performance in the split exhaust engine. Thus, a method to determine the composition of the recirculated gas in the split exhaust engine including blowthrough based on a unique configuration of the engine is desirable to estimate an EGR dilution rate (e.g., a dilution value or rate of the gases recirculated to the intake passage) for accurate engine control.

In one example, the issues described above may be addressed by a method for determining a dilution rate of gas recirculated from a first set of exhaust valves to an intake passage via a recirculation passage based on a temperature of gases in each of the recirculation passage and the intake passage, upstream and downstream of where the EGR passage couples to the intake passage, while flowing exhaust gas from a second set of exhaust valves to a turbocharger turbine and not to the intake passage. As one example, a period of delay may occur where the recirculated gas mixture may be travelling through the engine before arriving at the cylinders for combustion. During this period, engine dilution may be approximated by a steady state model based on the temperature measurements at regions upstream and downstream of the merging point of the EGR passage to the intake passage.

In addition, the steady state model may be used to correct a feedforward model to gain a more accurate estimate of the EGR rate to further improve engine performance. The feedforward model evaluates a total exhaust gas recirculation (EGR) mass flow, a temperature of the EGR gas, a mass of burnt gas, an airmass due to blowthrough, a fuel mass due to blowthrough, and a burnt gas fraction during engine transient events is used to estimate the EGR dilution rate. By accounting for the temperature (i.e. heat capacity) contributions of each component of the gas mixture (including fresh air and recirculated gas, or scavenge gas) circulated through the split exhaust engine and an effect of a pressure differential across an intake region, an estimation of the EGR rate that is corrected based on measured gas temperatures, may be tailored to an architecture of the split exhaust engine. As a result, engine operations such as fuel injection and spark timing may be adjusted to increase an efficiency and power output of the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
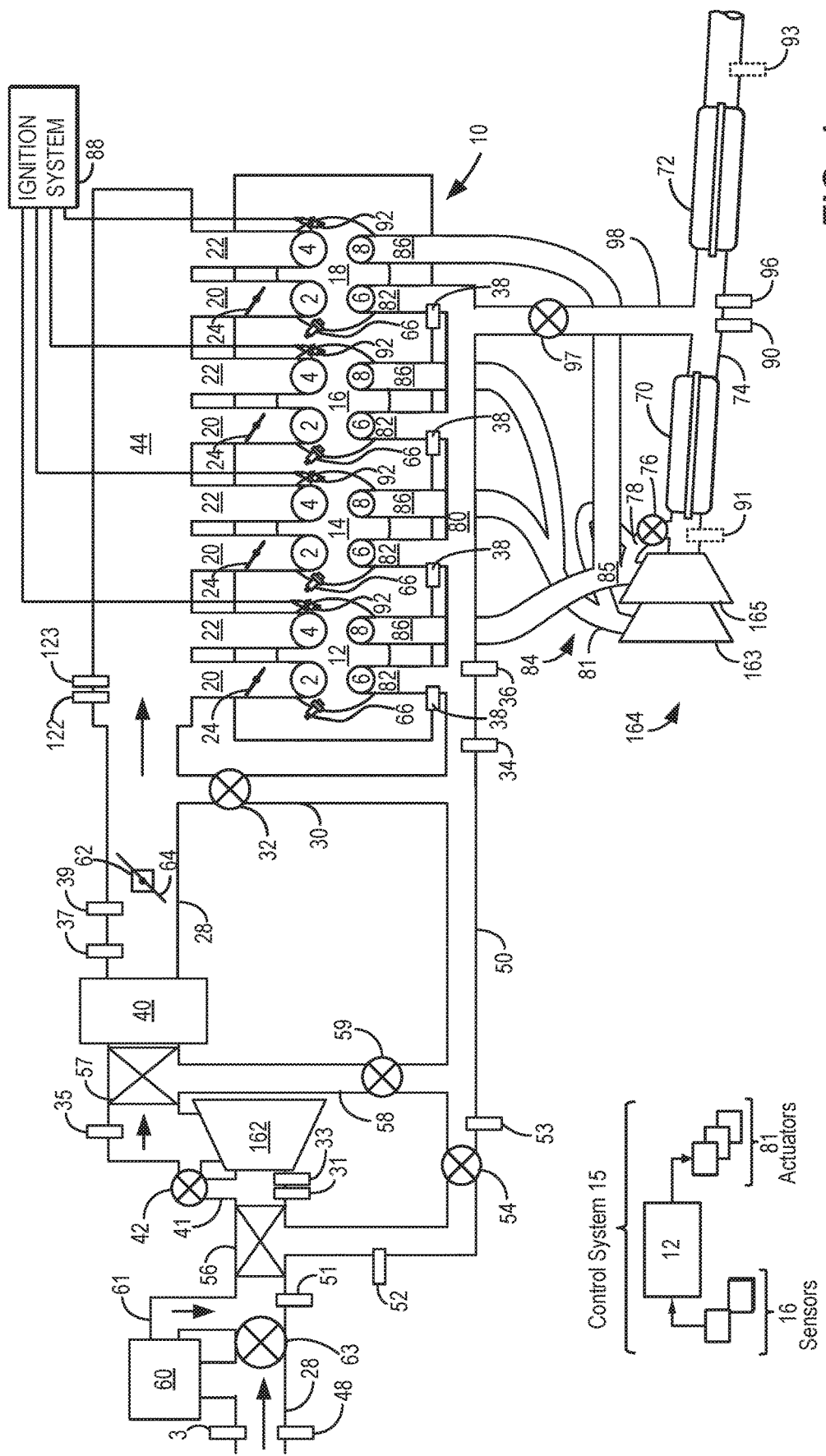
FIG. 1 shows a schematic depiction of a turbocharged engine system with a split exhaust system.
Figure 2:
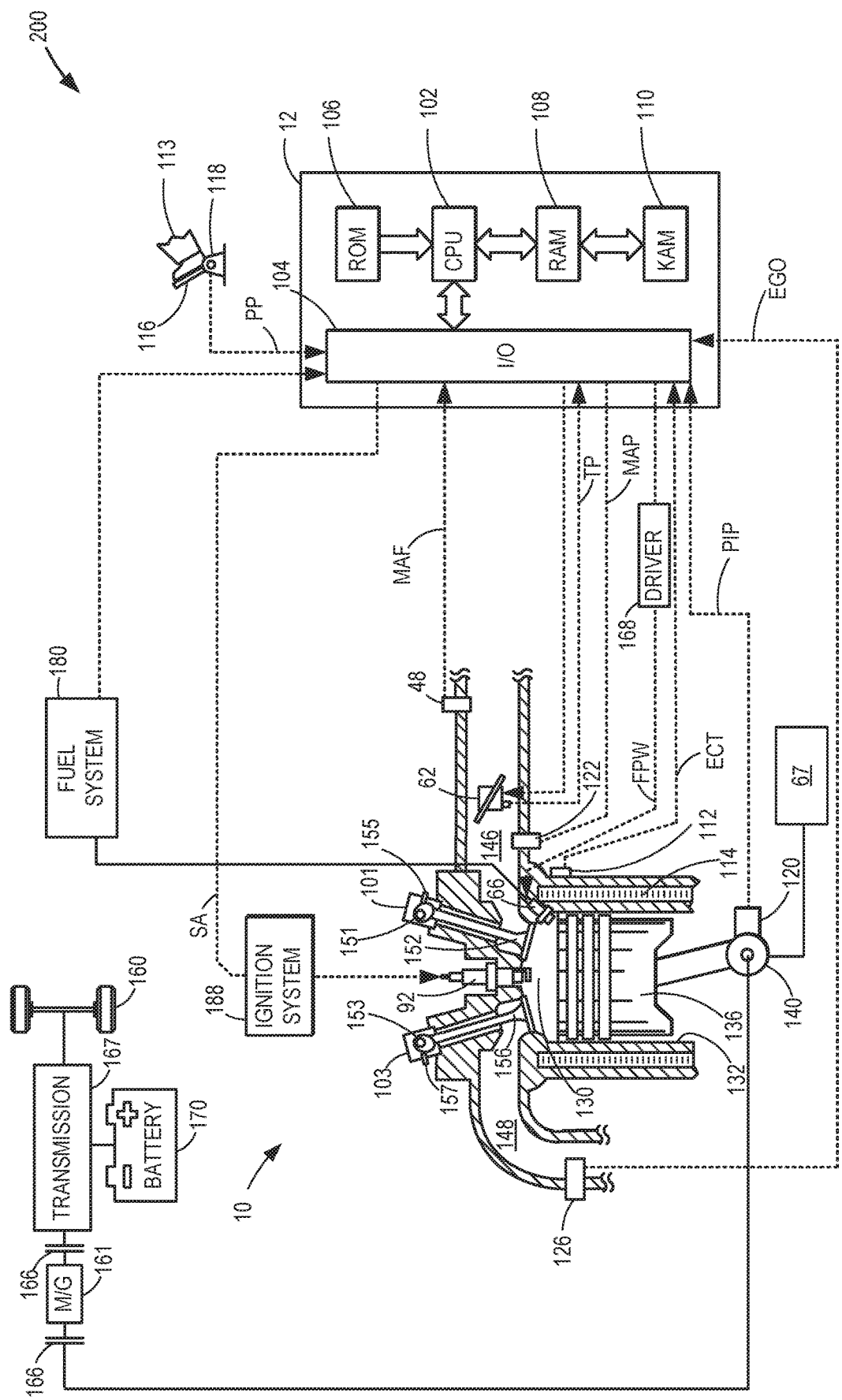
FIG. 2 shows an embodiment of a cylinder of the engine system of FIG. 1.
Figure 3:
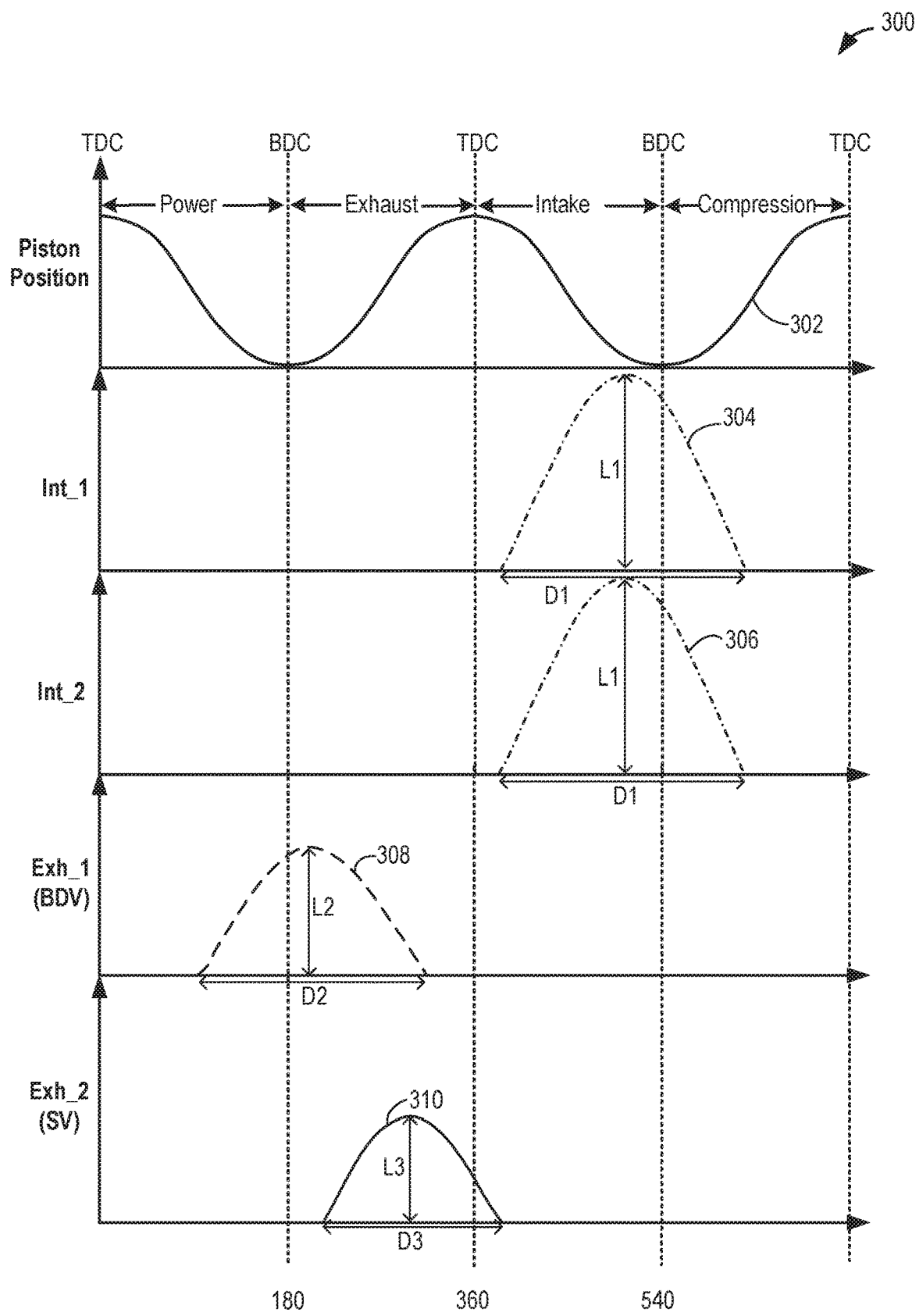
FIG. 3 shows example cylinder intake valve and exhaust valve timings for one engine cylinder of a split exhaust engine system.
Figure 4:
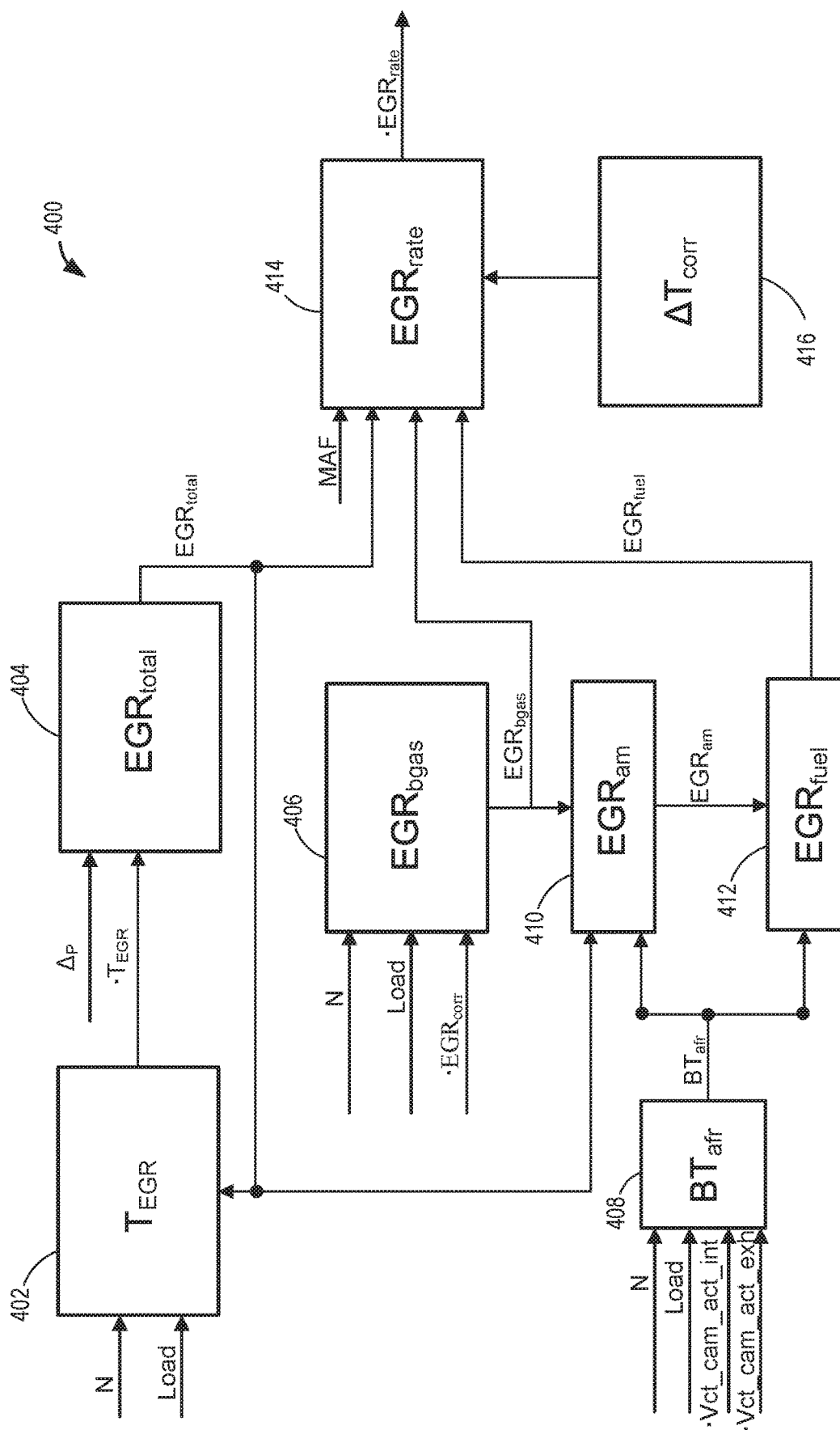
FIG. 4 shows a flow diagram of the variables used to calculate an EGR dilution rate flowing through a split exhaust system.
Figure 5:
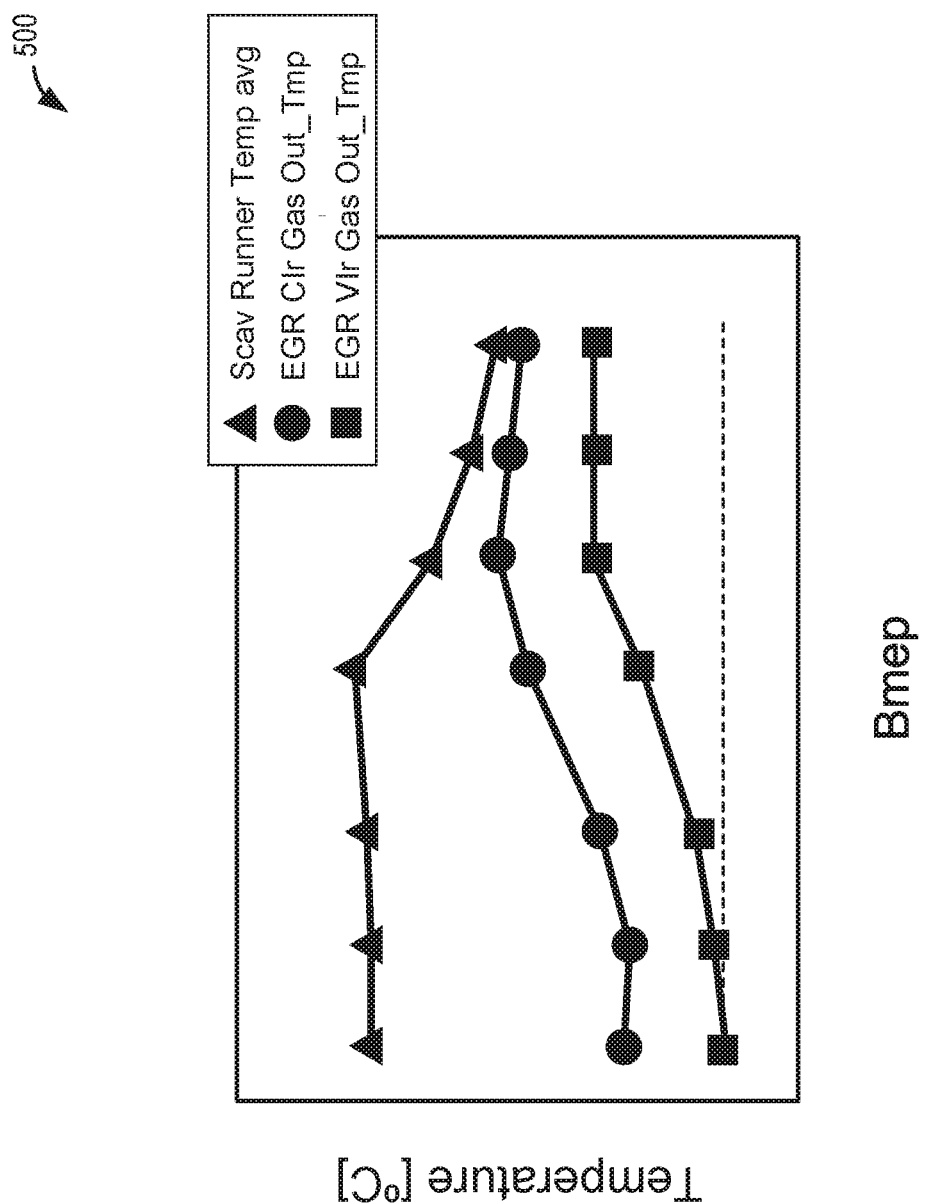
FIG. 5 shows an example map of average scavenge valve runner temperature as a function of brake mean effective pressure for calculating a temperature of EGR in a scavenge manifold.
Figure 6A:
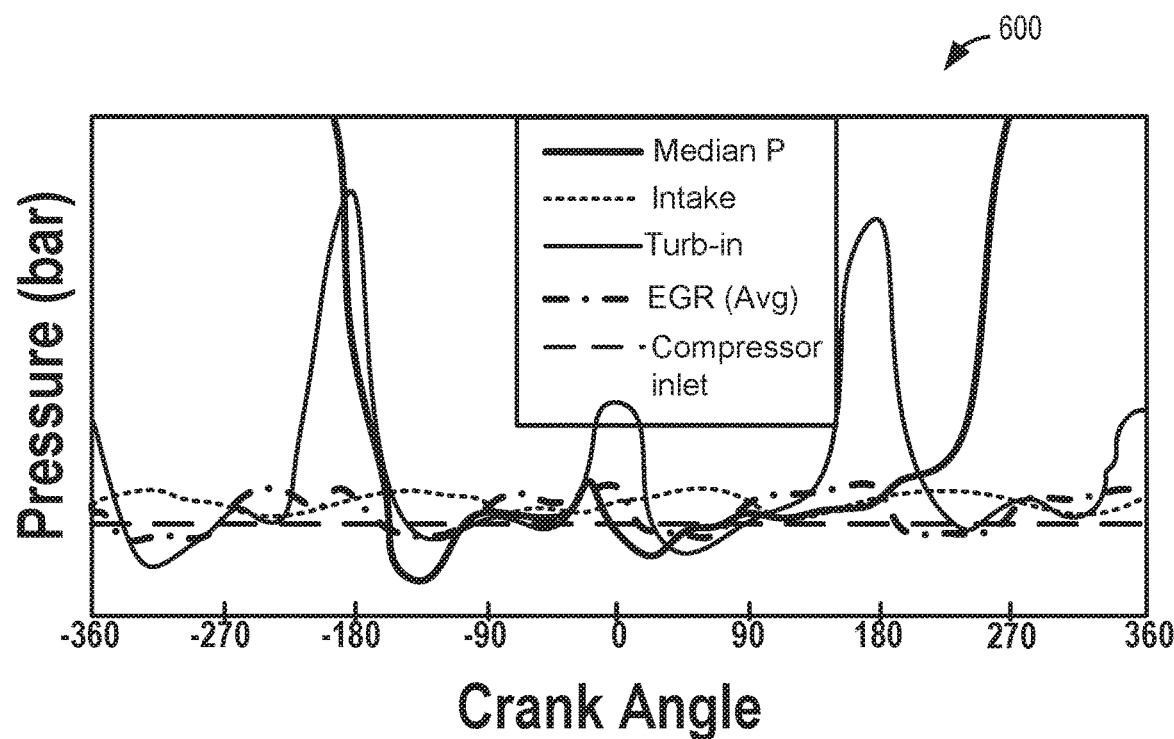
FIG. 6A shows an example map of pressure as function of crank angle at lower EGR flow, used for calculating a total EGR mass flow rate.
Figure 6B:
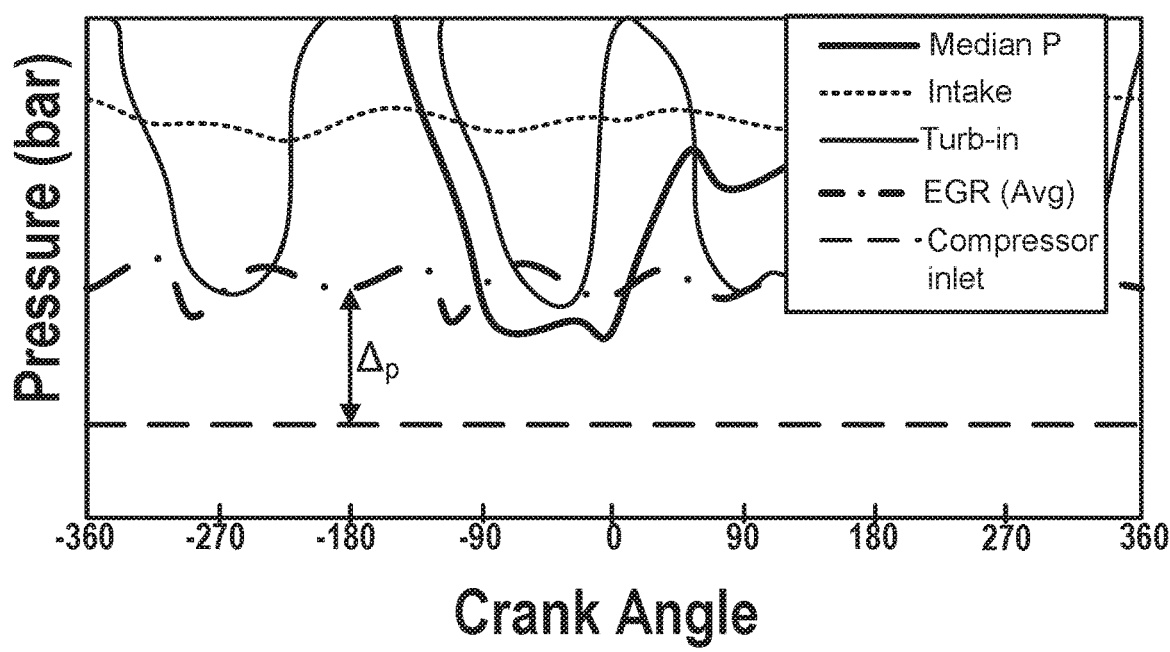
FIG. 6B shows an example map of pressure as function of crank angle at higher EGR flow, used for calculating a total EGR mass flow rate.
Figure 7:
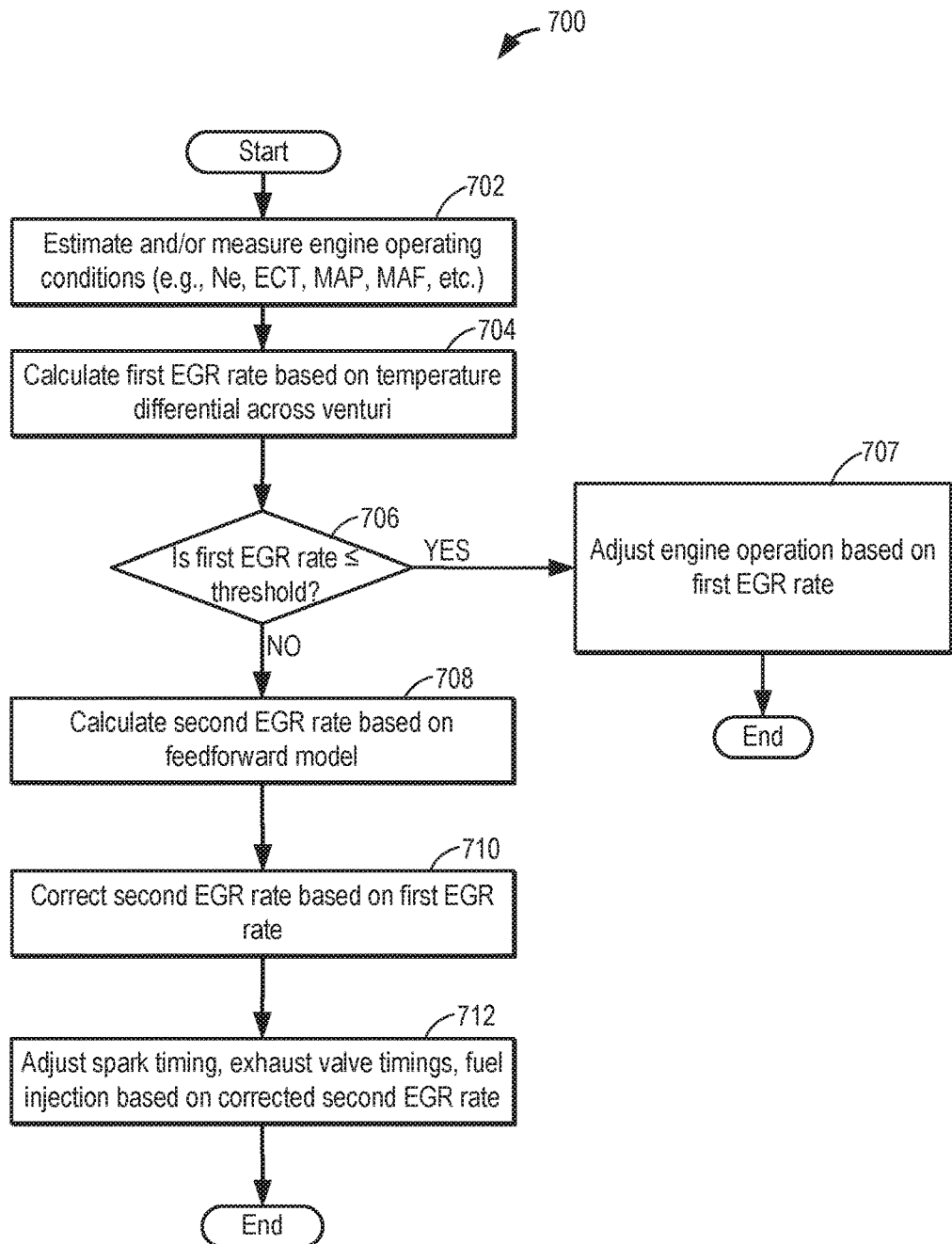
FIG. 7 shows an example routine for estimating a dilution rate of recirculated gases in a split exhaust engine.

The following description relates to systems and methods for operating a split exhaust engine with blowthrough and exhaust gas recirculation (EGR) to an intake via a scavenge exhaust manifold. As shown in FIG. 1, the split exhaust engine includes a first exhaust manifold (referred to herein as a blowdown exhaust manifold) coupled exclusively to a blowdown exhaust valve of each cylinder. The blowdown manifold is coupled to an exhaust passage of the engine, where the exhaust passage includes a turbocharger turbine and one or more emission control devices (which may include one or more catalysts). The split exhaust engine may also include a second exhaust manifold (referred to herein as a scavenge exhaust manifold) coupled exclusively to a scavenge exhaust valve of each cylinder. The scavenge manifold is coupled to the intake passage, upstream of a turbocharger compressor, via a first EGR passage including a first EGR valve (referred to herein as a scavenge EGR valve). In some embodiments, the split exhaust engine system may include additional passages coupled between the scavenge manifold and either the intake or exhaust passage, as shown in FIG. 1. Additionally, in some embodiments, the split exhaust engine system may include various valve actuation mechanisms and may be installed in a hybrid vehicle, as shown in FIG. 2. The scavenge exhaust valves and blowdown exhaust valves open and close at different times in an engine cycle, for each cylinder, in order to isolate scavenge and blowdown portions of combusted exhaust gases and direct these portions separately to the scavenge manifold and blowdown manifold. As shown in FIG. 3, an overlap period may exist between the intake valves and the scavenge exhaust valve of each cylinder where these valves are open at the same time. As a result, fresh, blowthrough air may flow into the EGR passage via the scavenge exhaust valve. Thus, during each engine cycle, the EGR passage may receive a combination of combusted exhaust gases, blowthrough air, and unburnt fuel and recirculate these combined gases to the intake passage. The specific architecture of the split exhaust engine system (as shown in the example of FIG. 1) and the timings of the cylinder valves which results in an increased proportion of blowthrough air in the gases recirculated to the intake via the EGR passage (compared to a traditional engine with EGR) makes it challenging to determine the dilution rate of gases recirculated to the intake via the EGR passage and travelling to the engine cylinders. In some examples, this dilution rate of recirculated gases may be referred to as the EGR rate; however, this EGR rate is the EGR rate of gases that include fresh, blowthrough air and unburnt fuel, in addition to combusted exhaust gas. In one example, the EGR rate (e.g., dilution rate of recirculated gases from the EGR passage to the intake passage) may be determined based on various engine operating conditions and mapped parameters/models, as shown in FIG. 4. Specifically, FIG. 4 shows calculated variables contributing to a feedforward model of EGR rate based on mapped parameters and a steady state correction which are used to estimate the EGR rate of the split exhaust engine. As an example for calculating a temperature of EGR gas at a region where the scavenge manifold intersects with an intake passage, a map of average scavenge runner temperature as a function of brake mean effective pressure is shown in FIG. 5. Example plots of pressures detected at certain regions of the engine as a function of engine crank angle are provided, illustrating a low EGR flow situation at FIG. 6A and a high EGR flow situation at FIG. 6B. The plots of FIGS. 6A-6B may be used to calculate a total EGR mass flow rate. An example routine for determining the EGR dilution rate and adjusting engine operations in response to the dilution rate is shown in FIG. 7 with respect to an engine controller. Example operations of a steady state model calculating a composition of gas flowing through the split exhaust engine used to correct the feedforward model are illustrated herein with reference to FIG. 8.

The model for EGR (e.g., dilution) rate determination shown in FIG. 4 may represent an estimation of the EGR flow rate during engine transients (e.g., transient engine operation). However, subsequent to periods of low EGR flow, such as during low engine speeds and loads, an increase in the EGR rate, as determined by the feedforward model, may deviate from a true EGR rate at the intake manifold due to a delay in time for the circulated gas mixture to be ingested at the engine cylinders. Thus, a steady state model for approximating EGR flow may be used to adjust timing of engine operations until the mixture of scavenge gas and fresh air is delivered to the engine intake. The steady state model may be determined based on a calculated temperature gradient across a region upstream of the intake manifold. In some examples, use of the steady state model may be continued even after the feedforward model becomes more effective as a temperature-derived correction to model the estimated EGR rate towards the true rate. In such events, the steady state model may be used as a correction for the feedforward model. However, in other examples, the feedforward model may be used solely to determine the dilution rate. Determination of the EGR rate estimates according to variables incorporated into both the transient, feedforward model, and the steady state correction are described herein.

In addition, any temperature sensor that depends upon adopting a temperature of the measured fluid may have an inherent time constant based on a surface to mass ratio. Decreasing a diameter of a sensing element of the sensor to that of a whisker, for example, may reduce the time constant to an insignificant value. However, manufacturing of such small diameter sensing elements may not be cost or time efficient. Thus, temperature measurements based on conventional sensors may be slow relative to how quickly the exhaust gas fraction in an air stream may change. While the temperature-based method for determining exhaust concentration in the engine air flow has increased accuracy, it may be slower to react to change, thus the feedforward method for faster responses to transient events, combined with the steady state flow measure for accuracy or adaptation, may increase the overall accuracy of the EGR rate estimates.

FIG. 1 shows a schematic diagram of a multi-cylinder internal combustion engine 10, which may be included in a propulsion system of an automobile. Engine 10 includes a plurality of combustion chambers (i.e., cylinders) which may be capped on the top by a cylinder head (not shown). In the example shown in FIG. 1, engine 10 includes cylinders 12, 14, 16, and 18, arranged in an inline-4 configuration. It should be understood, however, that though FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as described further below. Each of cylinders 12, 14, 16, and 18 include two intake valves, including first intake valve 2 and second intake valve 4, and two exhaust valves, including first exhaust valve (referred to herein as a blowdown exhaust valve, or blowdown valve) 8 and second exhaust valve (referred to herein as a scavenge exhaust valve, or scavenge valve) 6. The intake valves and exhaust valves may be referred to herein as cylinder intake valves and cylinder exhaust valves, respectively. As explained further below with reference to FIG. 2, a timing (e.g., opening timing, closing timing, opening duration, etc.) of each of the intake valves may be controlled via various camshaft timing systems. In one embodiment, both the first intake valves 2 and second intake valves 4 may be controlled to a same valve timing (e.g., such that they open and close at the same time in the engine cycle). In an alternate embodiment, the first intake valves 2 and second intake valves 4 may be controlled at a different valve timing. Further, the first exhaust valves 8 may be controlled at a different valve timing than the second exhaust valves 6 (e.g., such that a first exhaust valve and second exhaust valve of a same cylinder open at different times than one another and close at different times than one another), as discussed further below.

Each cylinder receives intake air (or a mixture of intake air and recirculated exhaust gas, as explained further below) from an intake manifold 44 via an air intake passage 28. Intake manifold 44 is coupled to the cylinders via intake ports (e.g., runners). For example, intake manifold 44 is shown in FIG. 1 coupled to each first intake valve 2 of each cylinder via first intake ports 20. Further, the intake manifold 44 is coupled to each second intake valve 4 of each cylinder via second intake ports 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

One or more of the intake ports may include a charge motion control device, such as a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other configurations of the valve are possible. Note that for the purposes of this disclosure the CMCV 24 is in the "closed" position when it is fully activated and the valve plate may be fully tilted into the respective first intake port 20, thereby resulting in maximum air charge flow obstruction. Alternatively, the CMCV 24 is in the "open" position when deactivated and the valve plate may be fully rotated to lie substantially parallel with airflow, thereby considerably minimizing or eliminating airflow charge obstruction. The CMCVs may principally be maintained in their "open" position and may only be activated "closed" when swirl conditions are desired. As shown in FIG. 1, only one intake port of each cylinder includes the CMCV 24. However, in alternate embodiments, both intake ports of each cylinder may include a CMCV 24. The controller 12 may actuate the CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active), as explained further below. As referred to herein, blowthrough air or blowthrough combustion cooling may refer to intake air that flows from the one or more intake valves of each cylinder to second exhaust valves 6 (and into second exhaust manifold 80) during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 2) may be used to generate fuel pressures at injectors 66. As such, fuel may be directly injected in the cylinders via injectors 66. Distributorless ignition system 88 provides an ignition spark to cylinders 12, 14, 16, and 18 via sparks plug 92 in response to controller 12. Cylinders 12, 14, 16, and 18 are each coupled to two exhaust ports for channeling the blowdown and scavenging portions of the combustion gases separately. Specifically, as shown in FIG. 1, cylinders 12, 14, 16, and 18 exhaust combustion gases (e.g., scavenging portion) to second exhaust manifold (referred to herein as a scavenge manifold) 80 via second exhaust runners (e.g., ports) 82 and combustion gases (e.g., blowdown portion) to first exhaust manifold (referred to herein as a blowdown manifold) 84 via first exhaust runners (e.g., ports) 86. Second exhaust runners 82 extend from cylinders 12, 14, 16, and 18 to second exhaust manifold 80. Additionally, first exhaust manifold 84 includes a first manifold portion 81 and second manifold portion 85. First exhaust runners 86 of cylinders 12 and 18 (referred to herein as the outside cylinders) extend from cylinders 12 and 18 to the second manifold portion 85 of first exhaust manifold 84. Additionally, first exhaust runners 86 of cylinders 14 and 16 (referred to herein as the inside cylinders) extend from cylinders 14 and 16 to the first manifold portion 81 of first exhaust manifold 84.

Each exhaust runner can selectively communicate with the cylinder it is coupled to via an exhaust valve. For example, second exhaust runners 82 communicate with their respective cylinders via second exhaust valves 6 and first exhaust runners 86 communicate with their respective cylinders via first exhaust valves 8. Second exhaust runners 82 are isolated from first exhaust runners 86 when at least one exhaust valve of each cylinder is in a closed position. Exhaust gases may not flow directly between exhaust runners 82 and 86. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another and thus the first and second portions of exhaust gases do not mix with one another within the first and second exhaust manifolds).

Engine 10 includes a turbocharger including a dual-stage exhaust turbine 164 and an intake compressor 162 coupled on a common shaft. Dual-stage turbine 164 includes a first turbine 163 and second turbine 165. First turbine 163 is directly coupled to first manifold portion 81 of first exhaust manifold 84 and receives exhaust gases only from cylinders 14 and 16 via first exhaust valves 8 of cylinders 14 and 16. Second turbine 165 is directly coupled to second manifold portion 85 of first exhaust manifold 84 and receives exhaust gases only from cylinders 12 and 18 via first exhaust valves 8 of cylinders 12 and 18. Rotation of first and second turbines drives rotation of compressor 162 disposed within the intake passage 28. As such, the intake air becomes boosted (e.g., pressurized) at the compressor 162 and travels downstream to intake manifold 44. Exhaust gases exit both first turbine 163 and second turbine 165 into common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve (referred to herein as a turbine wastegate) 76 controls an amount of boost provided by the turbocharger. In alternate embodiments, engine 10 may include a single stage turbine where all exhaust gases from the first exhaust manifold 84 are directed to an inlet of a same turbine.

Exhaust gases exiting dual-stage turbine 164 flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts. In other examples, emission control devices 70 and 72 may include one or a plurality of a diesel oxidation catalyst (DOC), and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12 of control system 15, as described further below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned between dual-stage turbine 164 and first emission control device 70 and/or third oxygen sensor 93 positioned downstream of second emission control device 72. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one embodiment, the one or more oxygen sensor 90, 91, and 93 may be Universal Exhaust Gas Oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1, a pressure sensor 96 is positioned within exhaust passage 74, between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as the scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor (e.g., turbocharger compressor) 162 (and thus may be referred to as a low-pressure EGR passage). As such, exhaust gases (or blowthrough air, as explained further below) is directed from second exhaust manifold 80 to intake passage 28, upstream of compressor 162, via first EGR passage 50. First EGR passage 50 is shown in FIG. 1 without an EGR cooler but in alternate embodiments, an EGR cooler may be arranged in first EGR passage 50 to cool exhaust gases flowing from second exhaust manifold 80 to intake passage 28 and a first EGR valve 54 (which may be referred to herein a scavenge EGR valve 54). Controller 12 is configured to actuate and adjust a position of first EGR valve 54 in order to control an amount of air flow through first EGR passage 50. When first EGR valve 54 is in a closed position, no exhaust gases or intake air may flow from second exhaust manifold 80 to intake passage 28, upstream of compressor 162. Further, when first EGR valve 54 is in an open position, exhaust gases and/or blowthrough air may flow from second exhaust manifold 80 to intake passage 28, upstream of compressor 162. Controller 12 may additionally adjust first EGR valve 54 into a plurality of positions between fully open and fully closed.

A first ejector 56 is positioned at an outlet of EGR passage 50, within intake passage 28. First ejector 56 may include a constriction or venturi that provides a pressure increase at the inlet of the compressor 162. As a result, EGR from the EGR passage 50 may be mixed with fresh air flowing through the intake passage 28 to the compressor 162. Thus, EGR from the EGR passage 50 may act as the motive flow on the first ejector 56. In an alternate embodiment, there may not be an ejector positioned at the outlet of EGR passage 50. Instead, an outlet of compressor 162 may be shaped as an ejector that lowers the gas pressure to assist in EGR flow (and thus, in this embodiment, air is the motive flow and EGR is the secondary flow). In yet another embodiment, EGR from EGR passage 50 may be introduced at the trailing edge of a blade of compressor 162, thereby allowing blowthrough air to intake passage 28 via EGR passage 50.

A second EGR passage 58 is coupled between first EGR passage 50 and intake passage 28. Specifically, as shown in FIG. 1, second EGR passage 58 is coupled to first EGR passage 50, upstream of EGR valve 54. Additionally, second EGR passage 58 is directly coupled to intake passage 28, downstream of compressor 162. Due to this coupling, second EGR passage 58 may be referred to herein as a midpressure EGR passage. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and exhaust gases) as it passes through CAC 40. As such, recirculated exhaust gases from first EGR passage 50 and/or second EGR passage 58 may be cooled via CAC 40 before entering intake manifold 44. In an alternate embodiment, second EGR passage 58 may be coupled to intake passage 28, downstream of CAC 40. Further, as shown in FIG. 1, a second ejector 57 may be positioned within intake passage 28, at an outlet of second EGR passage 58.

A second EGR valve 59 (e.g., mid-pressure EGR valve) is disposed within second EGR passage 58. Second EGR valve 59 is configured to adjust an amount of gas flow (e.g., intake air or exhaust) through second EGR passage 58. As described further below, controller 12 may actuate EGR valve 59 into an open position (allowing flow thorough second EGR passage 58), closed position (blocking flow through second EGR passage 58), or plurality of positions between fully open and fully closed based on (e.g., as a function of) engine operating conditions. For example, actuating the EGR valve 59 may include the controller 12 sending an electronic signal to an actuator of the EGR valve 59 to move a valve plate of EGR valve 59 into an open position, closed position, or some position between fully open and fully closed. As also explained further below, based on system pressures and positons of alternate valves in the engine system, air may either flow toward intake passage 28 within second EGR passage 58 or toward second exhaust manifold 80 within second EGR passage 58.

Intake passage 28 further includes an electronic intake throttle 62 in communication with intake manifold 44. As shown in FIG. 1, intake throttle 62 is positioned downstream of CAC 40. The position of a throttle plate 64 of throttle 62 can be adjusted by control system 15 via a throttle actuator (not shown) communicatively coupled to controller 12. By modulating air intake throttle 62, while operating compressor 162, an amount of fresh air may be inducted from the atmosphere and/or an amount of recirculated exhaust gas from the one or more EGR passages into engine 10, cooled by CAC 40 and delivered to the engine cylinders at compressor (or boosted) pressure via intake manifold 44. To reduce compressor surge, at least a portion of the aircharge compressed by compressor 162 may be recirculated to the compressor inlet. A compressor recirculation passage 41 may be provided for recirculating compressed air from the compressor outlet, upstream of CAC 40, to the compressor inlet. Compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80 and a second end of third flow passage 30 is directly coupled to intake passage 28, downstream of intake throttle 62 and upstream of intake manifold 44. A third valve 32 (e.g., hot pipe valve) is disposed within third flow passage 30 and is configured to adjust an amount of air flow through third flow passage 30. Third valve 32 may be actuated into a fully open position, fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes pressure sensors 34 and 53, temperature sensor 52, and oxygen sensor 36, disposed therein and configured to measure a pressure, a temperature, and an oxygen content, respectively, of exhaust gases and blowthrough (e.g., intake) air, exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38.

In some embodiments, as shown in FIG. 1, intake passage 28 may include an electric compressor 60. Electric compressor 60 is disposed in a bypass passage 61 which is coupled to intake passage 28, upstream and downstream of an electric compressor valve 63. Specifically, an inlet to bypass passage 61 is coupled to intake passage 28 upstream of electric compressor valve 63 and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested, over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 and a first intake temperature sensor 3, disposed upstream of compressor 162, electric compressor valve 63, and where first EGR passage 50 couples to intake passage 28. A first intake pressure sensor 51 may be arranged immediately upstream of the venturi of ejector 56. A second intake pressure sensor 31 and a second intake temperature sensor 33 are positioned in intake passage 28, upstream of compressor 162 and downstream of where first EGR passage 50 couples to intake passage 28. An intake oxygen sensor 35 and an intake temperature sensor 43 may be located in intake passage 28, downstream of compressor 162 and upstream of CAC 40. An additional intake pressure sensor 37 may be positioned in intake passage 28, downstream of CAC 40 and upstream of throttle 62. In some embodiments, as shown in FIG. 1, an additional intake oxygen sensor 39 may be positioned in intake passage 28, between CAC 40 and throttle 62. Further, an intake manifold pressure (e.g., MAP) sensor 122 and intake manifold temperature sensor 123 are positioned within intake manifold 44, upstream of all engine cylinders.

In some examples, engine 10 may be coupled to an electric motor/battery system (as shown in FIG. 2) in a hybrid vehicle. The hybrid vehicle may have a parallel configuration, series configuration, or variation or combinations thereof. Further, in some embodiments, other engine configurations may be employed, for example a diesel engine.

Engine 10 may be controlled at least partially by a control system 15 including controller 12 and by input from a vehicle operator via an input device (not shown in FIG. 1). Control system 15 is shown receiving information from a plurality of sensors 16 (various examples of which are described herein) and sending control signals to a plurality of actuators 83. As one example, sensors 16 may include pressure, temperature, and oxygen sensors located within the intake passage 28, intake manifold 44, exhaust passage 74, and second exhaust manifold 80, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 83 may include fuel injectors, valves 63, 42, 54, 59, 32, 97, 76, and throttle 62. Actuators 83 may further include various camshaft timing actuators coupled to the cylinder intake and exhaust valves (as described further below with reference to FIG. 2). Controller 12 may receive input data from the various sensors, process the input data, and trigger the actuators in response to the processed input data based on instruction or code programmed in a memory of controller 12 corresponding to one or more routines. Example control routines (e.g., methods) are described herein at FIG. 7. For example, adjusting EGR flow from second exhaust manifold 80 to intake passage 28 may include adjusting an actuator of first EGR valve 54 to adjust an amount of exhaust flow flowing to intake passage 28, upstream of compressor 162, from second exhaust manifold 80. In another example, adjusting EGR flow from second exhaust manifold 80 to intake passage 28 may include adjusting an actuator of an exhaust valve camshaft to adjust an opening timing of second exhaust valves 6.

In this way, the first and second exhaust manifolds of FIG. 1 may be configured to separately channel the blowdown and scavenging portions of the exhaust. First exhaust manifold 84 may channel the blowdown pulse of the exhaust to dual-stage turbine 164 via first manifold portion 81 and second manifold portion 85 while second exhaust manifold 80 may channel the scavenging portion of exhaust to intake passage 28 via one or more of first EGR passage 50 and second EGR passage 58 and/or to exhaust passage 74, downstream of the dual-stage turbine 164, via flow passage 98. For example, first exhaust valves 8 channel the blowdown portion of the exhaust gases through first exhaust manifold 84 to the dual-stage turbine 164 and both first and second emission control device 70 and 72 while second exhaust valves 6 channel the scavenging portion of exhaust gases through second exhaust manifold 80 and to either intake passage 28 via one or more EGR passages or exhaust passage 74 and second emission control device 72 via flow passage 98.

It should be noted that while FIG. 1 shows engine 10 including each of first EGR passage 50, second EGR passage 58, flow passage 98, and flow passage 30, in alternate embodiments, engine 10 may only include a portion of these passages. For example, in one embodiment, engine 10 may only include first EGR passage 50 and flow passage 98 and not include second EGR passage 58 and flow passage 30. In another embodiment, engine 10 may include first EGR passage 50, second EGR passage 58, and flow passage 98, but not include flow passage 30. In yet another embodiment, engine 10 may include first EGR passage 50, flow passage 30, and flow passage 98, but not second EGR passage 58. In some embodiments, engine 10 may not include electric compressor 60. In still other embodiments, engine 10 may include all or only a portion of the sensors shown in FIG. 1.

Referring now to FIG. 2, it depicts a partial view of a single cylinder of internal combustion engine 10 which may be installed in a vehicle 100. As such, components previously introduced in FIG. 1 are represented with the same reference numbers and are not re-introduced. Engine 10 is depicted with combustion chamber (cylinder) 130, coolant sleeve 114, and cylinder walls 132 with piston 136 positioned therein and connected to crankshaft 140. Combustion chamber 130 is shown communicating with intake passage 146 and exhaust passage 148 via respective intake valve 152 and exhaust valve 156. As previously described in FIG. 1, each cylinder of engine 10 may exhaust combustion products along two conduits. In the depicted view, exhaust passage 148 represents the first exhaust runner (e.g., port) leading from the cylinder to the turbine (such as first exhaust runner 86 of FIG. 1) while the second exhaust runner is not visible in this view.

As also previously elaborated in FIG. 1, each cylinder of engine 10 may include two intake valves and two exhaust valves. In the depicted view, intake valve 152 and exhaust valve 156 are located at an upper region of combustion chamber 130. Intake valve 152 and exhaust valve 156 may be controlled by controller 12 using respective cam actuation systems including one or more cams. The cam actuation systems may utilize one or more cam profile switching (CPS), variable cam timing (VCT), variable valve timing (VVT) and/or variable valve lift (VVL) systems to vary valve operation. In the depicted example, each intake valve 152 is controlled by an intake cam 151 and each exhaust valve 156 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the exhaust valve 156 such that it remains closed and does not open at its set timing. The position of intake valve 152 and exhaust valve 156 may be determined by valve position sensors 155 and 157, respectively. As introduced above, in one example, all exhaust valves of every cylinder may be controlled on a same exhaust camshaft. As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft and a blowdown exhaust valve of every cylinder may be controlled on a different, second exhaust camshaft. In this way, the valve timing of the scavenge valves and blowdown valves may be adjusted separately from one another. In alternate embodiments, the cam or valve timing system(s) of the scavenge and/or blowdown exhaust valves may employ a cam in cam system, an electro-hydraulic type system on the scavenge valves, and/or an electro-mechanical valve lift control on the scavenge valves.

For example, in some embodiments, the intake and/or exhaust valve may be controlled by electric valve actuation. For example, cylinder 130 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve (e.g., blowdown valve) just before BDC (bottom dead center) of the power stroke of combustion chamber 130 and close the same exhaust valve well before top dead center (TDC) to selectively exhaust blowdown gases from the combustion chamber. Further, a second exhaust cam profile can be positioned to open from close a second exhaust valve (e.g., scavenge valve) before a mid-point of the exhaust stroke and close it after TDC to selectively exhaust the scavenging portion of the exhaust gases.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency is improved. Turbine energy recovery may be enhanced and engine efficiency may be improved via increased EGR and reduced knock.

Continuing with FIG. 2, exhaust gas sensor 126 is shown coupled to exhaust passage 148. Sensor 126 may be positioned in the exhaust passage upstream of one or more emission control devices, such as devices 70 and 72 of FIG. 1. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 188 can provide an ignition spark to combustion chamber 130 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 130. While FIG. 2 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118 such as an accelerator pedal 116. The input device 118 sends a pedal position signal to controller 12. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 112 coupled to coolant sleeve 114; a profile ignition pickup signal (PIP) from Hall effect sensor 120 (or other type) coupled to crankshaft 140; throttle position (TP) from a throttle position sensor; absolute manifold pressure signal (MAP) from sensor 122, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

In some examples, vehicle 100 may be a hybrid vehicle with multiple sources of torque available to one or more vehicle wheels 160. In other examples, vehicle 100 is a conventional vehicle with only an engine, or an electric vehicle with only electric machine(s). In the example shown in FIG. 2, vehicle 100 includes engine 10 and an electric machine 161. Electric machine 161 may be a motor or a motor/generator and thus may also be referred to herein as an electric motor. Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 170 to provide torque to vehicle wheels 160. Electric machine 161 may also be operated as a generator to provide electrical power to charge battery 170, for example during a braking operation.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Now turning to FIG. 3, graph 300 depicts example valve timings with respect to a piston position, for an engine cylinder comprising 4 valves: two intake valves and two exhaust valves, such as described above with reference to FIG. 1. The example of FIG. 3 is drawn substantially to scale, even though each and every point is not labeled with numerical values. As such, relative differences in timings can be estimated by the drawing dimensions. However, other relative timings may be used, if desired.

Continuing with FIG. 3, the cylinder is configured to receive intake via two intake valves and exhaust a first blowdown portion to a turbine inlet via a first exhaust valve (e.g., such as first, or blowdown, exhaust valves 8 shown in FIG. 1), exhaust a second scavenging portion to an intake passage via a second exhaust valve (e.g., such as second, or scavenge, exhaust valves 6 shown in FIG. 1) and non-combusted blowthrough air to the intake passage via the second exhaust valve. By adjusting the timing of the opening and/or closing of the second exhaust valve with that of the two intake valves, residual exhaust gases in the cylinder clearance volume may be cleaned out and recirculated as EGR along with fresh intake blowthrough air.

Graph 300 illustrates an engine position along the x-axis in crank angle degrees (CAD). Curve 302 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the second exhaust (scavenge) valves may be opened after the beginning of the exhaust stroke and stay open until after the end of the exhaust stroke while the first exhaust (blowdown) valves are closed and the intake valves are opened to flush out residual exhaust gases with blowthrough air.

Curve 304 depicts a first intake valve timing, lift, and duration for a first intake valve (Int_1) while curve 306 depicts a second intake valve timing, lift, and duration for a second intake valve (Int_2) coupled to the intake passage of the engine cylinder. Curve 308 depicts an example exhaust valve timing, lift, and duration for a first exhaust valve (Exh_1, which may correspond to first, or blowdown, exhaust valves 8 shown in FIG. 1) coupled to a first exhaust manifold (e.g., blowdown exhaust manifold 84 shown in FIG. 1) of the engine cylinder, while curve 310 depicts an example exhaust valve timing, lift, and duration for a second exhaust valve (Exh_2, which may correspond to second, or scavenge, exhaust valves 6 shown in FIG. 1) coupled to a second exhaust manifold (e.g., scavenge manifold 80 shown in FIG. 1) of the engine cylinder. As previously elaborated, the first exhaust manifold connects a first exhaust valve to the inlet of a turbine in a turbocharger and the second exhaust manifold connects a second exhaust valve to an intake passage via an EGR passage. The first and second exhaust manifolds may be separate from each other, as explained above.

In the depicted example, the first and second intake valves are fully opened from a closed position at a common timing (curves 304 and 306), starting close to intake stroke TDC, just after CAD2 (e.g., at or just after intake stroke TDC) and are closed after a subsequent compression stroke has commenced past CAD3 (e.g., after BDC). Additionally, when opened fully, the two intake valves may be opened with the same amount of valve lift L1 for the same duration of D1. In other examples, the two valves may be operated with a different timing by adjusting the phasing, lift or duration based on engine conditions.

Now turning to the exhaust valves wherein the timing of the first exhaust valve and the second exhaust valve is staggered relative to one another. Specifically, the first exhaust valve is opened from a closed position at a first timing (curve 308) that is earlier in the engine cycle than the timing (curve 310) at which the second exhaust valve is opened from close. Specifically, the first timing for opening the first exhaust valve is between TDC and BDC of the power stroke, before CAD1 (e.g., before exhaust stroke BDC) while the timing for opening the second exhaust valve just after exhaust stroke BDC, after CAD1 but before CAD2. The first (curve 308) exhaust valve is closed before the end of the exhaust stroke and the second (curve 310) exhaust valve is closed after the end of the exhaust stroke. Thus, the second exhaust valve remains open to overlap slightly with opening of the intake valves.

To elaborate, the first exhaust valve may be fully opened from close before the start of an exhaust stroke (e.g., between 90 and 40 degrees before BDC), maintained fully open through a first part of the exhaust stroke and may be fully closed before the exhaust stroke ends (e.g., between 50 and 0 degrees before TDC) to collect the blowdown portion of the exhaust pulse. The second exhaust valve (curve 310) may be fully opened from a closed position just after the beginning of the exhaust stroke (e.g., between 40 and 90 degrees past BDC), maintained open through a second portion of the exhaust stroke and may be fully closed after the intake stroke begins (e.g., between 20 and 70 degrees after TDC) to exhaust the scavenging portion of the exhaust. Additionally, the second exhaust valve and the intake valves, as shown in FIG. 3, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions.

Additionally, the first exhaust valve may be opened at a first timing with a first amount of valve lift L2 while the second exhaust valve may be opened with a second amount of valve lift L3 (curve 310), where L3 is smaller than L2. Further still, the first exhaust valve may be opened at the first timing for a duration D2 while the second exhaust valve may be opened for a duration D3, where D3 is smaller than D2. It will be appreciated that in alternate embodiments, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in a cylinder) from residual exhaust gases at low pressure (e.g., exhaust gases that remain in the cylinder after blow-down) into the different passages. By conveying low pressure residual exhaust gases as EGR along with blowthrough air to the compressor inlet (via the EGR passage and second exhaust manifold), combustion chamber temperatures can be lowered, thereby reducing knock and spark retard from maximum torque. Further, since the exhaust gases at the end of the stroke are directed to either downstream of a turbine or upstream of a compressor which are both at lower pressures, exhaust pumping losses can be minimized to improve engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to improve turbocharger output. Additionally, fuel economy may be improved because blowthrough air is not routed to the catalyst, being directed to the compressor inlet instead, and therefore, excess fuel may not be injected into the exhaust gases to maintain a stoichiometric ratio.

Exhaust gases that are recirculated to an engine intake through the scavenge manifold, flowing from the second exhaust gas valves during an exhaust stroke of a cylinder, as described above for FIG. 3, may comprise a mixture of fresh air, burnt gas (e.g., combusted exhaust gas), and pushback fuel (e.g., unburnt fuel). Estimation of an EGR dilution rate, e.g. a fraction of burnt gas in an air mass at the compressor inlet, arising from the recirculated exhaust gases, out of the combined exhaust gas, fresh blowthrough air, and pushback fuel, at the engine intake may be achieved based on engine operating conditions. For example, engine speed and load may affect a combustion rate and hence the amount of exhaust gas generated. An amount of scavenge gas (a mixture of fresh blowthrough air, bunt gas, and pushback fuel) recirculated from the scavenge manifold to the intake may be regulated by a timing of an exhaust cam coupled to the scavenge exhaust valves. Additionally, the fraction of burnt gas recirculated to the engine cylinders may vary with a temperature of the scavenge gas.

A feedforward model may be used to approximate the EGR dilution for improved performance of a split exhaust engine. The model determines a set of variables contributing to the dilution rate and includes: a total EGR mass flow rate, a burnt gas mass flow rate, an EGR fuel mass, a temperature of EGR gases at an outlet of a venturi upstream of a turbocharger compressor, such as the venturi of ejector 56 of FIG. 1, a change in pressure across the venturi, a flow rate of a fresh air mass entering the intake, and a flow rate of a fraction of burnt gas in the EGR gas at an inlet of the turbocharger compressor. Relationships and contributions between the variables are illustrated in FIG. 4 in a flow diagram 400.

Flow diagram 400 depicts an embodiment of a model used to estimate (e.g., calculate) an EGR rate of gases (containing exhaust gases, blowthrough air, and/or unburnt fuel) recirculated from the scavenge exhaust manifold to the intake passage. The EGR rate may also be referred to as a burnt gas fraction and is based on contributions from variables representing mass flows, temperatures, and pressures, each detected from engine sensors, such as the sensors described above with respect to FIGS. 1 and 2, arranged at certain locations of a split exhaust engine, such as engine 10 of FIG. 1. At 402, the estimation model comprises calculating an air temperature of EGR gas, $T_{EGR}$, flowing through a region upstream of a turbocharger in which a venturi upstream may be arranged, with reference to the venturi of ejector 56 and compressor 162 of FIG. 1. For example, $T_{EGR}$, may be the temperature of the recirculated gases exiting the EGR passage and entering the intake passage, upstream of the compressor.

The $T_{EGR}$ is the product of a temperature of EGR gas in a scavenge manifold, such as the scavenge manifold 80 of FIG. 1, and a temperature correction accounting for loss of heat across the scavenge manifold. The calculation for the $T_{EGR}$ may be described as, $$T_{EGR} = T_{SM} * T_{EGRcorr} \quad (1)$$

where $T_{SM}$ is the scavenge manifold temperature and $T_{EGRcorr}$ is the temperature correction. In one example, the scavenge manifold temperature may be a measured temperature obtained at a temperature sensor positioned in the scavenge manifold, such as temperature sensor 52 of FIG. 1, or from temperature sensors arranged in scavenge runners, such as the second exhaust runners 82 of FIG. 1, and averaged. In another example, $T_{SM}$ may be determined based on engine speed and load. For example, $T_{SM}$ may be mapped as a function of engine speed and load and plotted against brake mean effective pressure (BMEP), as shown in FIG. 5. The map may be pre-loaded in a memory of an engine controller, such as controller 12 of FIG. 1. Alternatively, look-up tables configured with data providing the $T_{SM}$ according to a current engine speed and load, during engine operation, may be stored in the controller's memory. In another example, the controller may be programmed to calculate the $T_{SM}$ from a pre-set mathematical equation where current engine speed and engine load are inputs.

The temperature correction, $T_{EGRcorr}$, accounts for heat transfer across a region between the location of the temperature sensor where the $T_{SM}$ is measured and the region immediately upstream of the compressor inlet, if the temperature sensor is upstream of a scavenge EGR valve, such as the first EGR valve 54 of FIG. 1. As an example, differences in measured temperature along the scavenge manifold are shown in plot 500 of FIG. 1 for one set of engine operating conditions.

Plot 500 of FIG. 5 shows an average scavenge runner temperature, an EGR cooler outlet temperature, EGRClrOut_Tmp (in embodiments of the split exhaust engine which include an EGR cooler in the EGR passage), and a temperature of exhaust gas flowing out of scavenge manifold exhaust valves (EGRVlvGasOut_Tmp) relative to BMEP (in psi or bar) along the x-axis. BMEP is defined as a theoretical average pressure that, if uniformly imposed on pistons from the top to the bottom of each power stroke, produces the measured power output of the engine. The average scavenge runner temperature may be determined by temperature measurements obtained from temperature sensors arranged in the scavenge exhaust runners. The EGRClrOut_Tmp may be measured by a temperature sensor arranged downstream of the scavenge exhaust runners and upstream of the scavenge EGR valve and the EGRVlvGasOut_Tmp may be measured downstream of the scavenge exhaust valve and upstream of the venturi. The average scavenge runner temperature may be consistently higher than both the EGRClrOut_Tmp and the EGRVlvGasOut_Tmp, and the EGRClrOut_Tmp may be consistently higher than the EGRVlvGasOut_Tmp. Estimated differences in temperature according to location of temperature sensors may be stored as look-up tables, such as plot 500 of FIG. 5, and referred to by the controller.

In one example, the split exhaust engine may be configured with temperature sensors at the scavenge exhaust runners but not downstream of the scavenge EGR valve, e.g. the EGRVlvGasOut_Tmp may not be directly measured. However, the EGRVlvGasOut_Tmp provides the $T_{SM}$ for the $T_{EGR}$ calculation. The average scavenge runner temperature may be used as an alternative and corrected based on the estimated difference in temperature according to plot 500. A magnitude of the $T_{EGRcorr}$ may vary depending on location of temperature sensors used for temperature measurements and difference between ambient temperature and EGR gas temperature. Furthermore, vehicle speed may be included as an input variable that may affect the estimated $T_{EGR}$. A manual or automated calibration effort may place the estimated steady state values equal to the measured steady state values. The model may thereby be adjusted (i.e. calibrated) until the estimated data sufficiently agrees with the measured data.

It will be appreciated that the description above for the calculation of the $T_{EGR}$ is a non-limiting example of how the $T_{EGR}$ may be determined and there may be numerous alternative methods to estimate the $T_{EGR}$. In any example of the $T_{EGR}$ calculation, however, the feedforward, open loop model may provide the transient information and temperature based data from the steady state model may provide the steady state data. In the feedforward model, a bandpass filter may be applied to each temperature signal that passes all signals greater than 0.5 Hz to be added to data from the steady state model that may use a band pass filter that passes everything below 0.5 Hz. When added together, a complete signal may be reconstructed. Data from a real (slow but accurate) temperature measurement and a virtual temperature measurement, estimated from other system parameters, is fused into a single set of values.

Returning to FIG. 4, at 404 of the estimation model, the $T_{EGR}$ is used to determine the total EGR flow rate, $EGR_{total}$. The $EGR_{total}$ is a total mass flow rate reaching the intake manifold and includes a combination of fresh air from the intake passage, introduced upstream of the venturi, and of the scavenge gas mixture comprising burnt gas, fresh blow-through air, and fuel vapor that is recirculated from the scavenge manifold to the intake passage, at a region upstream of the venturi. The $EGR_{total}$ may be described as:

$$EGR_{total} = f(\Delta_p, T_{EGR}) \quad (3)$$

where the $EGR_{total}$ is a function of a pressure differential, $\Delta_p$, across the venturi, or across the EGR valve and the venturi, upstream of the compressor at the region where the EGR passage couples to an intake passage (e.g., intake passage 28 of FIG. 1), and the calculated $T_{EGR}$. Determination of the $\Delta_p$ may be based on pressures measured by pressure sensors arranged upstream of the venturi in the intake passage, such as pressure sensor 51 of FIG. 1, and arranged upstream of the venturi and scavenge EGR valve in the EGR passage, such as pressure sensor 53 of FIG. 1.

In another example, the two flow rates (fresh air and recirculated scavenge gas) flowing into the venturi and the flow rate exiting the venturi may be determine based on one flow (e.g., the fresh air) and the concentration of EGR in the fresh air stream. Thus, the EGR flow rate may be estimated based on measuring the air flow rate by a MAF sensor.

In one example, the pressure sensor in the EGR passage may be positioned upstream of the scavenge EGR valve (e.g., pressure sensor 53 and first EGR valve 54 of FIG. 1) and the pressure measured may not account for changes in pressure across the scavenge EGR valve. In another example, the pressure sensor may be positioned downstream of the scavenge EGR valve, thereby detecting pressure after any potential change in pressure due to the scavenge EGR valve. A pressure at an inlet of the venturi may be approximated based on the pressure contributions from the intake passage and the scavenge manifold, for example, by calculating a weighted average. A pressure downstream of the venturi, measured or inferred based on a calculated reduction in pressure provided by the venturi, is subtracted from the pressure at the inlet to give $\Delta_p$. In another example, the pressure downstream of the venturi, at the compressor inlet may be assumed to be at atmospheric pressure, e.g., 1 bar. A pressure differential across the venturi may be determined based on the measured and calculated pressures, as a function of engine speed and load, and stored in the controller's memory. Alternatively, for improved accuracy during low gas through the scavenge manifold and/or low air flow through the intake passage, a differential pressure sensor may be used to measure a difference in pressure between an inlet and an outlet of the venturi.

The $\Delta_p$ across the venturi may show significant variation in value. For example, the change in pressure across the venturi may range from 5 kPa during low EGR flow rates up to 25 kPa during high EGR flow rates, the increase in EGR flow rate arising from increased engine speed and load. The change in $\Delta_p$ is mapped in plot 600 of FIG. 6A and plot 650 of FIG. 6B, showing pressure relative to crank angle. A low EGR flow situation is shown in FIG. 6A where little change is detected between the pressure at the inlet of the venturi, averaged between pressure in the intake passage (Intake) and pressure in the scavenge manifold and EGR passage (EGR (Avg)), and pressure downstream of the venturi (Compressor inlet). In FIG. 6B, a high EGR flow situation is shown and the difference between the pressure upstream and downstream of the venturi ($\Delta_p$) is much larger. The $EGR_{total}$ may be used directly in the calculation of the EGR rate at step 414.

At 406 of flow diagram 400, the mass flow rate of burnt gas (e.g., combusted air/fuel or combusted exhaust gas), $EGR_{bgas}$, is calculated as a product of a mapped EGR burnt gas flow, which is a function of engine speed and engine load, $EGR_{bgas}'$, and an EGR flow correction, which is a function of exhaust valve timing, $EGR_{con}(\text{Exh\_vlv})$. The calculation may be represented by the following equation:

$$EGR_{bgas} = EGR_{bgas}' * EGR_{corr} \quad (4)$$

The $EGR_{bgas}'$ is a burned gas flow rate determined by mapping the rate as a function of engine speed and load. The $EGR_{corr}$, is a correction factor applied to the mapped $EGR_{bgas}'$ that is calculated based on an actuation timing of the blowthrough and scavenge exhaust valves. The $EGR_{corr}$ accounts for an effect of exhaust valve cam timing on the $EGR_{bgas}$. Maps of the $EGR_{bgas}'$ may be stored in the controller's memory and consulted during engine operation based on the current engine speed and load and corrected based on the current exhaust valve cam timing. The $EGR_{bgas}$ may be applied to the determination of a rate of air mass flow in the EGR gas at 410 of the estimation model.

At 410, the rate of air mass flow in the EGR gas, $EGR_{am}$, may be calculated and used at 412 where a rate of fuel mass flow in the EGR gas, $EGR_{fuel}$, may be calculated. Both calculations incorporate a blowthrough air/fuel ratio (AFR), $BT_{afr}$, that may be determined at 408. The $BT_{afr}$ is a function of an amount of push back fuel and in one embodiment, may be assumed stoichiometric (e.g., 14.1:1 for a gasoline engine). The $BT_{afr}$ may be assumed stoichiometric and used to calculate the $EGR_{am}$ according to:

$$EGR_{am} = (EGR_{total} - EGR_{bgas})(BT_{afr}/(BT_{afr}+1)) \quad (5)$$

The $BT_{afr}$ may deviate from stoichiometric, however, as a result of changes in manifold absolute pressure (MAP) and/or scavenge manifold pressure. This deviation may have little effect on the $EGR_{am}$ but have a greater impact on the $EGR_{fuel}$ calculation. Thus, a stoichiometric air/fuel ratio may be used to calculate the $EGR_{am}$ while adjustment of the $BT_{afr}$ in response to changes in engine speed, load and cam timing may be desired to improve accuracy of the estimated $EGR_{fuel}$. Alternatively, a UEGO may be used to estimate instantaneous fluid temperature in the exhaust gas.

In another embodiment, the domination of blowthrough air over push-back fuel at higher MAP conditions may lead to a leaner $BT_{afr}$. The $BT_{afr}$ may be mapped based on timing of the scavenge exhaust cam versus the timing of the intake exhaust cam. The $EGR_{fuel}$ may be calculated from the $EGR_{am}$ and the $BT_{afr}$ according to:

$$EGR_{fuel} = EGR_{am}(1/BT_{afr}) \quad (6)$$

showing that the impact of the $BT_{afr}$ on the $EGR_{fuel}$ is much larger than on the $EGR_{am}$. To improve an accuracy of the estimation, determination of the change in $BT_{afr}$ with a type of fuel injection may be desired. For example, different maps may be used depending on the type of fuel injection. When fuel is introduced to the engine cylinders by port fuel injection (PFI), the AFR may be adjusted to compensate for puddled fuel. This compensation may vary with engine speed and load which affects a rate at which additional fuel from the puddled fuel is combusted, e.g., the higher the engine speed and load, the faster puddled fuel is introduced through the intake valves which may be balanced by adjusting the AFR to be leaner.

In another example, when the fuel is injected by DI, fuel is not puddled and since the blow through air is assumed stoichiometric and predominant (over pushback fuel) the AFR adjustment accounts for excess air exclusively. As another example, when a combination of PFI and DI is used for combustion, adjustment of the AFR to compensate for puddled fuel may be corrected based on the relative fractions of fuel injected by PFI versus DI. In this way, maps or look-up tables for each of the injection systems described above may be stored in the controller memory, providing AFRs as functions of engine speed and load for determination of the $BT_{afr}$.

At 414, the EGR rate is determined based on the mass air flow (MAF), measured by a MAF sensor such as MAF sensor 48 of FIG. 1, the $EGR_{total}$, the $EGR_{bgas}$, and the $EGR_{fuel}$ according to:

$$\text{EGR rate} = EGR_{bgas}/(MAF + EGR_{total} - EGR_{fuel}) \quad (7)$$

The EGR rate may be used to determine an engine dilution. Engine operations such as spark advance and retard, fuel injection timing, and intake and exhaust cam timing may be adjusted in response to the calculated engine dilution to improve a fuel efficiency and power output of the engine. For example, less fuel may be injected during high EGR rates, or spark ignition may be advanced to achieve maximum torque. Overlap between opening of the blowdown exhaust valves and scavenge exhaust valves may be increased or decreased depending on the EGR rate to adjust a turbine speed or exhaust manifold pressure. Furthermore, a scavenge manifold bypass valve (SMBV), such as the SMBV 97 of FIG. 1, may be actuated to maintain a pressure in the scavenge manifold when the EGR rate increases.

The estimation of engine dilution by approximating the EGR rate via mapping of various parameters as described above for FIG. 4 may provide a robust model for EGR flow during engine transients. However, there may be events during which the EGR rate provided by the feedforward model of FIG. 4 may deviate from the actual rate delivered to the engine intake. For example, engine transients leading to increases in EGR flow after periods of low EGR rate, such as during low engine speeds and loads, may include a period of time for the newly generated scavenge gas to be mixed with intake air and ingested at the engine cylinders. In one example, this delay may occur over a period of six cylinder cycles. However, in other examples, the delay may occur faster or slower, depending on characteristics of the engine. During this interval, the EGR rate calculated according to the feedforward model of FIG. 4 may be greater than an actual EGR rate observed in the intake manifold but engine operations may be adjusted to the calculated rate. Engine efficiency and performance may be degraded as a result.

An offset of the estimated EGR rate from the actual rate during the period of time for recirculation of the scavenge gas mixture to the intake may be decreased by applying a temperature-based correction, $\Delta T_{corr}$, to the EGR rate, shown at 416 of FIG. 4. The $\Delta T_{corr}$ may be a steady state model that computes mass flow proportions of recirculated scavenge gas to air, providing a concentration of recirculated gas within a main flow of a mixture of gases, e.g. the gas mixture flowing into the venturi. The recirculated flow rate may be determined from the main flow, which is measured or inferred, and by subtracting the EGR flow rate, based on the feedforward model, from the recirculated flow rate, a flow of fuel vapor and air in the main flow may be estimated. Engine operations such as ignition timing, cam angles, etc., may be adjusted based on a calculated flow of fuel vapor and air when the engine is in a steady state. During engine transients, the feedforward model may, in one example, be used to approximate EGR rate and continuously corrected based on the inferred steady state flow of fuel vapor and air, from temperature measurements, to accommodate delays in recirculated gas delivery to the cylinders. In other examples, during engine operations where the delay between generation of a burnt gas fraction in an air mass and delivery of the air mass to the intake manifold is decreased, the feedforward model may be used exclusively to estimate the dilution rate.

A ratio of recirculated scavenge gas to air in a main air mass (including fuel vapor, fresh air, and combusted exhaust gas) to the intake of the split exhaust engine may be estimated using temperatures measured at certain regions of the engine. For example, a temperature of intake air entering the intake passage may be measured by a temperature sensor arranged upstream of the venturi, such as the first intake temperature sensor 3 of FIG. 1. A temperature of scavenge gas recirculated through the scavenge manifold to the engine intake via the EGR passage may be measured by a temperature sensor positioned in the EGR passage, downstream of the scavenge EGR valve, such as temperature sensor 52 of FIG. 1. A temperature of a combined gas mixture flowing out of the venturi outlet to the compressor inlet may be measured by a temperature sensor such as the second intake temperature sensor 31 of FIG. 1. A list of variables used in the determination of circulated gas concentration may include:

$m_{air}$=mass flow of intake air upstream of the venturi $m_{circ}$=mass flow of gas mixture (e.g., burnt gas, fuel vapor, fresh air) recirculated through scavenge manifold upstream of the venturi $T_{air}$=temperature of intake air upstream of the venturi $T_{circ}$=temperature of recirculated gas mixture upstream of the venturi $T_{comb}$=temperature of combined intake air and recirculated gas mixture downstream of the venturi and upstream of the compressor inlet $Cp_{air}$=specific heat of air $Cp_{circ}$=specific heat of gas mixture recirculated through the scavenge manifold to the intake The ratio of recirculated gas to air is calculated as:

$$m_{cir}/m_{air} = [(T_{comb} - T_{air})/(T_{circ} - T_{air})] * (CP_{air}/CP_{circ}) \quad (8)$$

The specific heats of air and circulated gas may be estimated by taking into account the gaseous compositions of the air masses. For example, air may be assumed to comprise 21% oxygen, and 79% nitrogen. Using a specific heat of oxygen, $Cp_{oxy}$ and a specific heat of nitrogen, $Cp_{nitro}$, the $Cp_{air}$ may be calculated as:

$$Cp_{air} = (0.21 * Cp_{oxy}) + (0.79 * Cp_{nitro}) \quad (9)$$

where the values $Cp_{oxy}$ and $Cp_{nitro}$ are dependent on the temperature of the air. In another example, the recirculated gas mixture may comprise 21% water, 10.5% carbon dioxide, and 79% nitrogen (note that the total is equal to 110.5% rather than 100%). The $Cp_{circ}$ is calculated according to:

$$Cp_{circ} = [(0.21 * Cp_{water}) + (0.105 * Cp_{co2}) + (0.79 * Cp_{nitro})] * 100/110.5 \quad (10)$$

where the specific heats of water, $Cp_{water}$, and of carbon dioxide, $Cp_{co2}$, are also dependent on and vary according to the temperature of the recirculated gas mixture of the scavenge manifold.

In this way, the mass flow proportions of recirculated scavenge gas to fresh air may be calculated based on a principle of conservation of energy. The measured temperatures may deviate from actual temperatures, however, due to a relatively slow speed of heat conduction in temperature sensors. For example, a thermocouple or thermistor with a 0.1 mm diameter may receive temperature information after a 0.05 second delay, adversely affecting an accuracy of the steady state model. The speed of temperature relay may be improved by using a smaller diameter thermocouple or thermistor with a faster response time.

For a split exhaust engine, such as engine 10 of FIG. 1, engine operating parameters, such as spark advance, fuel injection, intake valve cam timing, and exhaust valve cam timing, may be adjusted to enhance engine power output and performance based on the estimated EGR rate. The EGR rate is a dilution rate based on a mixture of gases, recirculated from a scavenge manifold to a region of the intake passage upstream of the compressor. The gas mixtures may include fresh blowthrough air, fuel vapor (from unburnt fuel), and combusted exhaust gas (burnt gas) fractions of each type of gas may be determined from a plurality of engine variables and corrected by a temperature-based steady state model, as described in FIG. 4. An example routine for estimation of the EGR rate is depicted in a method 700 of FIG. 7 for the split exhaust engine. The EGR rate for the split exhaust engine may be approximated during engine transients by the feedforward model. The feedforward model may be built upon measuring a pressure differential across the region of the intake passage upstream of the compressor inlet and downstream of where the scavenge manifold couples to the intake passage via an EGR passage, in which a flow constriction, such as a venturi, may be positioned. Mapped variables such as an exhaust cam timing, a scavenge manifold temperature, a burned gas flow rate, etc. may also be included in in the determination. The feedforward model may be further improved by correction via the steady state model that utilizes a calculated temperature differential to evaluate concentrations of exhaust gas, fuel vapor and air in an air mass circulated through the split exhaust engine. Instructions for carrying out method 700 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 702, the method includes estimating and/or measuring the operating conditions of the engine. These may include, for example, engine speed and load, MAP, a pressure within the scavenge manifold and within the EGR passage coupling the scavenge manifold to the intake air passage, oxygen content in gas flowing through an exhaust passage, a pressure of the intake air passage, an intake cam and an exhaust cam position, a pressure at the compressor inlet, gas temperatures within the intake passage and scavenge manifold, etc. For example, the exhaust cam positioning may be determined from an exhaust valve position sensor, such as valve position sensor 157 of FIG. 2, and used to infer a timing of exhaust valve actuation. The controller may then use the exhaust valve timing as a function of the engine speed and load to refer to a corresponding map or look-up table stored in the memory of the controller. The data provided by the map or look-up table may be used to calculate a burnt gas contribution to estimate the EGR flow rate via the feedforward model during transient engine conditions.

At 704 of the method, a first EGR rate may be estimated based on the steady state model that is calculated from measurements obtained from temperature sensors in the intake passage, upstream of the venturi, in the scavenge manifold or EGR passage, also upstream of the venturi, and from the intake passage between the venturi and the compressor inlet, e.g. at 416 of FIG. 4. The first EGR rate may be determined based on temperatures measured from temperature sensors arranged in the intake passage and EGR passage, upstream of where the EGR passage couples to the intake passage, as well as downstream of where the EGR passage couples to the intake passage. The calculated first EGR rate may be compared to a threshold flow rate at 706.

The threshold EGR flow rate may represent a rate that determines when the feedforward model (as explained above in reference to 414 and 416 in FIG. 4) for estimating a second EGR rate may be used. At flow rates equal to or below the threshold, a pressure gradient across the venturi may be too low to be mapped for calculating total EGR mass flow rate for the feedforward model. Thus, if the EGR rate is estimated to be at or below the threshold, the method returns to 707 to adjust engine operations such as spark timing, intake and exhaust valve timings, fuel injection etc., based on the first EGR rate.

If the first EGR rate is determined to be above the threshold, e.g., not at or below the threshold, the method continues to 708. In alternate embodiments, the method may proceed directly from 704 to 708 regardless of the first EGR rate relative to the threshold.

At 708, a second EGR rate is calculated based on the mapping of engine parameters according to the feedforward model, as described above at 402-414 in FIG. 4. At 710, the second EGR rate determined at 708 is corrected (e.g., adjusted) based on the first EGR rate determined at 704. For example, the controller may obtain temperature measurements to compute the first EGR rate and apply the first EGR rate as a correction factor to the second EGR rate via a pre-set mathematical equation stored in a memory of the controller expressing a relationship between the first EGR rate and second EGR rate.

At 712, the method includes adjusting engine operation based on the corrected EGR rate determined at 710. Adjusting engine operation may include adjusting spark timing, exhaust valve timing (e.g., exhaust valve cam timing), and/or fuel injection (e.g., adjusting an amount of fuel injected by or a pulse width of one or more fuel injectors). For example, if the EGR rate is determined to increase as a result of increased engine speed and load, a spark timing may be advanced to account for a shorter period of time between spark and optimum peak pressure angle of the cylinders. As another example, the exhaust valve timing may be modified to increase overlap between an opening of blowdown exhaust valves, such as blowdown exhaust valves 8 of FIG. 1, and an opening of scavenge exhaust valves, such as exhaust valves 6 of FIG. 1 to maintain an amount and pressure of scavenge gas recirculated to the engine intake. Furthermore, a fuel injection timing may be adjusted according to spark advance to provide a desirable air-to-fuel ratio at ignition.

Adjusting engine operations based on a combination of the feedforward model and steady state model may have a significant impact on performance of the split exhaust engine. For example, if the EGR rate were estimated based on conventional EGR calculations configured with a single set of exhaust valves and recirculating just burnt gas, the calculated EGR rate may not account for introduction of blowthrough air into the scavenge gas recirculated through the split exhaust engine. The resulting AFR may be estimated to be too rich and lead to fueling to the cylinders that is too low. By using models that account for a recirculated mixture of gases, improved fueling and combustion efficiency may be achieved.

Figure 8:
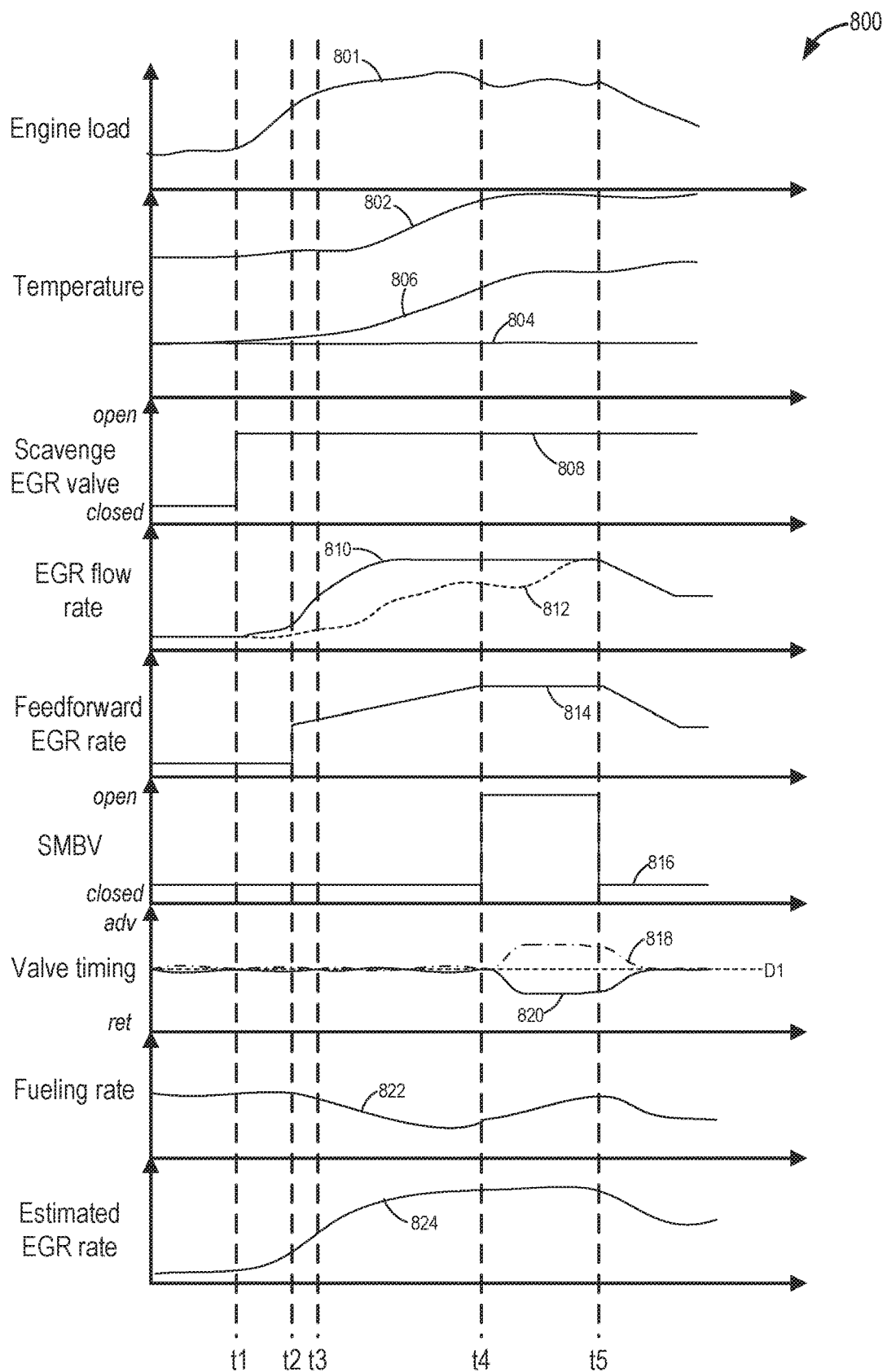
FIG. 8 shows example adjustments to engine operating parameters responsive to a determined dilution rate of gases recirculated to an intake in an intake of a split exhaust engine.

Example engine operation of a split exhaust engine, such as engine 10 of FIG. 1, based on an estimate of an EGR rate (e.g., dilution rate) of gases flowing from a scavenge manifold to an intake passage, upstream of a compressor are now discussed with reference to FIG. 8. As elaborated in map 800 of FIG. 8, engine load, determined by mass air flow into the engine intake, is shown at plot 801, a temperature of scavenge gas (e.g. blowthrough air, fuel vapor and burnt gas), measured within the scavenge manifold is shown at plot 802. A temperature of intake air, measured in the intake passage upstream of a venturi arranged at a region where the scavenge manifold is coupled to the intake passage via an EGR passage, is shown at plot 804, and a temperature of a combined gas mixture, measured downstream of the venturi and upstream of a turbocharger compressor, is shown at plot 806. A position of a scavenge EGR valve, such as the scavenge EGR valve 54 of FIG. 1, is indicated at plot 808. EGR rates, representing dilution rates at the engine intake based on a mixture of fresh intake air, blowthrough air, fuel vapor, and burnt gas are shown at plots 810, 812, 814, and 824. Plot 810 is an actual EGR rate and is compared with a steady state modeled EGR rate at plot 812, the steady state modeled EGR rate calculated based on a temperature gradient across the venturi, such as at 416 of FIG. 4 and described by equations 8-10 above. An EGR rate determined from a feedforward transient model, as shown at 401-414 in FIG. 4, is depicted at plot 814. A position of a scavenge manifold bypass valve (SMBV), such as the SMBV 97 of FIG. 1 is shown at plot 816. Adjustment of the positions of the scavenge EGR valve and SMBV may be based on EGR rates calculated from the steady state and feedforward models. Though the valve positions may be shown as open and closed in FIG. 8, in alternate embodiments, the valves may be adjusted into a plurality of positions between fully open and fully closed. A timing of intake valves is shown at plot 818 and exhaust valve timing is shown at plot 820 and a default timing is indicated by default line D1. In an embodiment where the scavenge exhaust valves and blowdown exhaust valves are controlled via a same cam system, the exhaust valve timing at plot 820 may be the timing for both the scavenge exhaust valves and the blowdown exhaust valves. A fueling rate at the engine intake, e.g., fuel injection by DI, PFI or PFIDI, is shown at plot 822. The timing of intake and exhaust valves and fueling rate may be adjusted based on a final, estimated EGR rate, shown at plot 824, that may be determined from a combination of the steady state EGR rate shown at 812 and the feedforward EGR rate shown at 814 (or one or the other). For example, at lower EGR rates, the estimated EGR rate at 824 may be calculated solely from the steady state model. As the amount or flow rate of EGR increases, the feedforward model may provide an accurate approximation of the actual EGR rate when corrected by the steady state model.

Prior to t1 of map 800, engine load is relatively low (plot 801) and the temperature of the scavenge gas (plot 802), is higher than the temperatures of the intake air (plot 804) and combined gas mixture (plot 806), the combined gas mixture comprising mostly intake air due to a closed position of the scavenge EGR valve (plot 808). For example, the scavenge gas may be 90° C. while the intake air and combined gas mixture may be at ambient temperature, such as 20° C. The actual EGR flow rate (plot 810), steady state modelled EGR flow rate (plot 812), and feedforward modelled EGR flow rate (814) are at 0% of a maximum allowable EGR flow, also as a result of the closed position of the scavenge EGR valve. The estimated EGR rate (plot 824) is also at 0%. The SMBV (plot 816) is also closed prior to t1. Intake and exhaust valve timings are at the default timing (plots 818 and 820), and the fueling rate (plot 822) is moderate, adjusted based on a stoichiometric AFR resulting from low engine load with no EGR flow from the scavenge manifold.

At t1, engine load begins to rise and combustion at the engine cylinders increases so that exhaust gas generation also increases. As pressure in the scavenge manifold accumulates, the scavenge EGR valve opens (or increases an opening). The actual, measured EGR flow rises slightly to a nonzero positive percentage between t1 and t2. At such low EGR flow, the feedforward model may not detect an increase in the pressure differential across the venturi, thus the feedforward modeled EGR rate is estimated to remain at 0%. The estimated EGR rate is based exclusively on the steady state model and also increases between t1 and t2. During this interval, the estimated EGR rate is not high enough to alter engine operations and the SMBV remains closed, intake valve and exhaust valve timings are at the default, and the fueling rate is unchanged.

At t2, engine load continues to increase, although at a slower rate. While the temperature of the intake air remains at ambient, the combined gas mixture slowly rises in temperature due to a gradual increase in temperature of the scavenge gas. The scavenge EGR valve remains open, allowing an increase in flow of EGR to be delivered to the intake. The EGR rate is sufficiently high to induce a measurable change in the pressure differential across the venturi, invoking an abrupt rise in the feedforward modeled EGR flow rate while the calculation of the EGR rate by the steady state model shows a slight increase in EGR rate. The SMBV is maintained closed and intake valve and exhaust valve timings remain at the default timings. The estimated EGR rate converts to the feedforward model and incorporates the correction based on the steady state model. The fueling rate is decreased in response to the increasing estimated EGR rate of recirculated scavenge gas, containing fuel vapor and burnt gas, that is delivered to the engine cylinders (e.g., a greater fraction of exhaust gas is delivered to the engine cylinders and thus less fueling is desired).

At t3, engine load begins to plateau at elevated mass air flow and the actual EGR rate continues to increase briefly and then becomes level. The estimated EGR rate, based on the steady state-corrected feedforward model, shows a similar levelling of the rate. In response to the estimated EGR rate, the fueling rate decreases between t3 to t4. Little change in the scavenge gas and the combined gas mixture temperatures occur between t2 and t3 but both temperatures increase between t3 and t4. The temperature of the intake air remains uniform and the SMBV is maintained closed between t3 and t4. The intake valve timing and exhaust valve timing are unchanged.

The actual EGR flow rate is constant between t3 and t4. However, the steady state modeled EGR rate continues to rise due to increases in the scavenge and combined gas mixture temperatures. The feedforward modeled EGR rate also rises but in a linear manner due to an increase in the pressure differential across the venturi. The resulting estimated EGR rate gradually plateaus between t3 and t4.

At t4, the engine load remains high, and the estimated EGR rate, based on the steady state-corrected feedforward model, reaches a maximum rate and plateaus during the interval between t4 and t5. The maximum rate may be determined based on adjustment of the intake and exhaust valve timings to provide a maximum amount of exhaust gas flow out of the scavenge exhaust valves. Shortly after t4, the intake valve timing is advanced and the exhaust valve timing is retarded in response to the estimated EGR rate reaching the maximum rate. The portion of blowthrough air in the scavenge gas is increased, leading to a leaner AFR at the intake. In response to the change in the AFR, the fueling rate is increased between t4 and t5 while the intake and exhaust valve timings deviate from the default timing. The SMBV is opened (or the opening is increased relative to the closed position) at t4 to vent excess EGR to an exhaust passage. The scavenge gas and combined gas mixture temperatures become relatively constant by t4 and show little change between t4 and t5.

At t5, engine load decreases but is still high enough that the scavenge EGR valve remains open. In response, the estimated EGR rate also decreases after t5, reflecting decreases in the steady state and feedforward modeled EGR rates and simulating the actual EGR rates. The SMBV is closed and valve timing returns to the default timing. The fueling rate also decreases as the AFR approaches stoichiometric.

In this way, a dilution rate may be estimated for a split exhaust engine that accounts for a unique configuration of intake and exhaust gas flows of the engine. A feedforward model may be used during engine transients that determines the rate based on mapped engine parameters Such parameters include a pressure differential across region downstream of a merging point between an intake passage and an EGR passage coupled to a scavenge manifold and upstream of a turbocharger compressor, as well as exhaust valve timing as a function of engine speed and load, and a blowthrough air-to-fuel ratio. The feedforward model may be supported by a steady state model that estimates a burnt gas fraction of the gas mixture delivered to the engine intake based on a temperature differential across the region downstream of the merging point between the intake passage and the EGR passage. The steady state model may be used at low EGR rates as an alternative to the feedforward model and also used as a correction factor for the feedforward model to account for delays between generation of a particular burnt gas fraction and transport of the gas mixture to the combustion chambers. By providing a robust method for estimating the EGR rate, timing of engine operations may be adjusted accordingly to increase engine performance. The technical effect of estimating the EGR rate by the combination of the steady state model and feedforward model is to more accurately estimate the EGR rate of recirculated gas from a scavenge manifold containing each of fresh, blowthrough air, combusted exhaust gas, and unburnt fuel. As a result of more accurately estimating the EGR rate, engine operating parameters (such as spark timing, fuel injection, and cylinder valve timings) may be more accurately adjusted to increase engine power output and reduce a likelihood of engine knock.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As one embodiment, a method includes determining a dilution rate of gas recirculated from a first set of exhaust valves to an intake passage via a recirculation passage based on a temperature of gases in each of the recirculation passage and the intake passage, upstream and downstream of where the EGR passage couples to the intake passage, while flowing exhaust gas from a second set of exhaust valves to a turbocharger turbine and not to the intake passage. In a first example of the method, each cylinder includes one valve from each of the first and second set of exhaust valves. A second example of the method optionally includes the first example, and further includes adjusting one or more of fuel injection to engine cylinders and spark timing based on the determined dilution rate. A third example of the method optionally includes one or more of the first and second examples, and further includes, wherein determining the dilution rate of gas recirculated from the first set of exhaust valves to the intake passage includes determining the dilution rate of gas recirculated from the first set of exhaust valves to the intake passage, upstream of a turbocharger compressor based on each of a first temperature of intake air in the intake passage, upstream of the turbocharger compressor, a second temperature of recirculated gases in the recirculation passage, upstream of where the recirculation passage couples to the intake passage, and a third temperature of combined air and recirculated gasses in the intake passage, downstream of the turbocharger compressor. A fourth example of the method optionally includes one or more of the first through third examples, and further includes, wherein determining the dilution rate of gas recirculated from the first set of exhaust valves to the intake passage includes determining a first dilution rate of gas recirculated from the first set of exhaust valves to the intake passage based on each of engine speed, engine load, a pressure differential across a flow constriction arranged in the intake passage downstream of where the recirculation passage couples to the intake passage, and a cam timing of the first set of exhaust valves, determining a second dilution rate of gas recirculated from the first set of exhaust valves to the intake passage based on the temperature of gases in each of the recirculation passage and the intake passage, upstream and downstream of where the recirculation passage couples to the intake passage, and correcting the first dilution rate with the second dilution rate to determine a final, corrected dilution rate. A fifth example of the method optionally includes one or more of the first through fourth examples, and further includes, adjusting engine operation based on the final, corrected dilution rate. A sixth example of the method optionally includes one or more of the first through fifth examples, and further includes, opening the first set of exhaust valves at a different timing in an engine cycle than the second set of exhaust valves. A seventh example of the method optionally includes one or more of the first through sixth examples, and further includes, wherein the gas recirculated from the first set of exhaust valves includes a portion of each of burnt combustion gases, fresh blowthrough air, and unburnt fuel. An eighth example of the method optionally includes one or more of the first through seventh examples, and further includes, combusting air and fuel in each engine cylinder and then: first, flowing a first portion of combusted gases to the turbocharger turbine disposed in an exhaust passage via the second set of exhaust valves; second, flowing a second portion of combusted gases to the intake passage via the first set of exhaust valves; and, third, flowing fresh, blowthrough air to the intake passage via the first set of exhaust valves. A ninth example of the method optionally includes one or more of the first through eighth examples, and further includes, not flowing blowthrough air to the turbocharger compressor and further comprising flowing a portion of the second portion of combusted gases to the exhaust passage, downstream of the turbocharger turbine.

In another embodiment, a method includes flowing gases from a first set of exhaust valves to a compressor disposed in an intake passage and flowing exhaust gas from a second set of exhaust valves to a turbine disposed in an exhaust passage and not to the intake passage, where each cylinder of a plurality of engine cylinders includes one valve of the first set of exhaust valves and one valve of the second set of exhaust valves, determining a dilution rate of the gases flowing from the first set of exhaust valves to the compressor based on a temperature of each of: the gases flowing from the first set of exhaust valves to the compressor, before the gases enter the intake passage, intake air flowing in the intake passage, upstream of where the gases from the first set of exhaust valves enter the intake passage, and combined gases flowing through the intake passage, downstream of where the gases from the first set of exhaust valves enter the intake passage, and adjusting one or more of fuel injection to the plurality of engine cylinders and spark timing based on the determined dilution rate. In a first example of the method, the gases from the first set of exhaust valves includes a combination of combusted exhaust gases and fresh, blowthrough air, where an amount of fresh, blowthrough air is based on a valve opening overlap period between the first set of exhaust valves and intake valves of each cylinder, and wherein the combusted exhaust gases from the second set of exhaust valves does not contain fresh, blowthrough air. A second example of the method optionally includes the first example and further includes wherein the determined dilution rate of the gases flowing from the first set of exhaust valves to the compressor is a first determined dilution rate, further comprising determining a second dilution rate of gases flowing from the first set of exhaust valves to the compressor based on each of engine speed, engine load, a pressure differential across a flow constriction arranged in the intake passage, and a cam timing of the first set of exhaust valves, and further comprising correcting the second determined dilution rate with the first determined dilution rate to determine a final dilution rate and adjusting one or more of fuel injection to the plurality of engine cylinders and spark timing based on the final determined dilution rate. A third example of the method optionally includes one or more of the first and second examples, and further includes, wherein flowing gases from the first set of exhaust valves to the compressor includes flowing a combination of combusted exhaust gases, fresh blow through air, and unburnt fuel from the first set of exhaust valves to the intake passage, upstream of the compressor, via an exhaust gas recirculation (EGR) passage including an EGR valve and wherein the second determined dilution rate is further based on a differential pressure across the EGR valve and the flow constriction. A fourth example of the method optionally includes one or more of the first through third examples, and further includes, wherein adjusting one or more of fuel injection to the plurality of engine cylinders and spark timing based on the determined dilution rate includes actuating one or more fuel injectors to increase an amount of fuel injected into the plurality of engine cylinders in response to the determined dilution rate decreasing.

As another embodiment, a system for an engine includes a first set of exhaust valves exclusively coupled to a first exhaust manifold, the first exhaust manifold coupled to an intake passage, upstream of a turbocharger compressor, via an exhaust gas recirculation (EGR) passage, the EGR passage including an EGR valve, a second set of exhaust valves exclusively coupled to a second exhaust manifold coupled to an exhaust passage, upstream of a turbocharger turbine disposed in the exhaust passage, a plurality of engine cylinders, each including one of the first set of exhaust valves and one of the second set of exhaust valves, and a controller including memory with instructions stored thereon for determining a dilution rate of gases flowing from the first set of exhaust valves to the turbocharger compressor via the EGR passage based on a first temperature of gases in the EGR passage, a second temperature of gases in the intake passage, upstream of where the EGR passage couples to the intake passage, and a third temperature of gases in the intake passage, downstream of the turbocharger compressor, and adjusting spark timing and fuel injection to the plurality of engine cylinders based on the determined dilution rate. In a first example of the system, the first set of exhaust valves open at a different timing than the second set of exhaust valves and wherein there is a valve overlap period between the first set of exhaust valves and intake valves of the plurality of engine cylinders where the one exhaust valve and intake valves of each cylinder are both open while the second set of exhaust valves are closed. A second example of the system optionally includes the first example, and further includes a bypass passaged coupled between the first exhaust manifold and the exhaust passage, downstream of the turbocharger turbine. A third example of the system optionally includes one or more of the first and second examples, and further includes, a first temperature sensor positioned in the EGR passage, a second temperature sensor positioned in the intake passage, upstream of where the EGR passage couples to the intake passage, and a third temperature sensor positioned in the intake passage, downstream of the turbocharger compressor and wherein the first temperature, second temperature, and third temperature are measured temperatures determined from outputs of each of the first temperature sensor, second temperature sensor, and third temperature sensor, respectively. A fourth example of the system optionally includes one or more of the first through third examples, and further includes, wherein the instructions further include instructions for determining the dilution rate based on engine speed, engine load, a cam timing of the first set of exhaust valves, and a differential pressure across the EGR valve and a flow constriction positioned in the intake passage downstream of where the EGR passage couples to the intake passage.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   determining, via an electronic controller, a dilution rate of gas recirculated from a first set of exhaust valves to an intake passage via a recirculation passage based on a differential pressure across a flow constriction positioned in the intake passage downstream of where the recirculation passage couples to the intake passage, a temperature of gases in each of the recirculation passage and the intake passage, upstream and downstream of where the recirculation passage couples to the intake passage, while flowing exhaust gas from a second set of exhaust valves to a turbocharger turbine and not to the intake passage; and
   adjusting, via the electronic controller, one or more of fuel injection to engine cylinders and spark timing based on the determined dilution rate.

2. The method of claim 1, wherein each cylinder includes one valve from each of the first and second set of exhaust valves.

3. The method of claim 1, wherein determining the dilution rate of gas recirculated from the first set of exhaust valves to the intake passage includes determining the dilution rate of gas recirculated from the first set of exhaust valves to the intake passage, upstream of a turbocharger compressor based on each of a first temperature of intake air in the intake passage, upstream of the turbocharger compressor, a second temperature of recirculated gases in the recirculation passage, upstream of where the recirculation passage couples to the intake passage, and a third temperature of combined air and recirculated gases in the intake passage, downstream of the turbocharger compressor.

4. The method of claim 1, wherein determining the dilution rate of gas recirculated from the first set of exhaust valves to the intake passage includes determining a first dilution rate of gas recirculated from the first set of exhaust valves to the intake passage based on each of engine speed, engine load, the differential pressure across the flow constriction arranged in the intake passage downstream of where the recirculation passage couples to the intake passage, and a cam timing of the first set of exhaust valves, determining a second dilution rate of gas recirculated from the first set of exhaust valves to the intake passage based on the temperature of gases in each of the recirculation passage and the intake passage, upstream and downstream of where the recirculation passage couples to the intake passage, and correcting the first dilution rate with the second dilution rate to determine a final, corrected dilution rate.

5. The method of claim 4, further comprising adjusting engine operation based on the final, corrected dilution rate.

6. The method of claim 1, further comprising opening the first set of exhaust valves at a different timing in an engine cycle than the second set of exhaust valves.

7. The method of claim 1, wherein the gas recirculated from the first set of exhaust valves includes a portion of each of burnt combustion gases, fresh blowthrough air, and unburnt fuel.

8. The method of claim 1, further comprising combusting air and fuel in each engine cylinder and then: first, flowing a first portion of combusted gases to the turbocharger turbine disposed in an exhaust passage via the second set of exhaust valves; second, flowing a second portion of combusted gases to the intake passage via the first set of exhaust valves; and, third, flowing fresh, blowthrough air to the intake passage via the first set of exhaust valves.

9. The method of claim 8, further comprising not flowing blowthrough air to a turbocharger compressor and further comprising flowing a portion of the second portion of combusted gases to the exhaust passage, downstream of the turbocharger turbine.

10. A method, comprising:
    flowing gases from a first set of exhaust valves to a compressor disposed in an intake passage and flowing exhaust gas from a second set of exhaust valves to a turbine disposed in an exhaust passage and not to the intake passage, where each cylinder of a plurality of engine cylinders includes one valve of the first set of exhaust valves and one valve of the second set of exhaust valves;
    determining a dilution rate of the gases flowing from the first set of exhaust valves to the compressor based on a differential pressure across a flow constriction positioned in the intake passage downstream of where a recirculation passage couples to the intake passage, and a temperature of each of: the gases flowing from the first set of exhaust valves to the compressor, before the gases enter the intake passage, intake air flowing in the intake passage, upstream of where the gases from the first set of exhaust valves enter the intake passage, and combined gases flowing through the intake passage, downstream of where the gases from the first set of exhaust valves enter the intake passage; and
    adjusting one or more of fuel injection to the plurality of engine cylinders and spark timing based on the determined dilution rate.

11. The method of claim 10, wherein the gases from the first set of exhaust valves include a combination of combusted exhaust gases and fresh, blowthrough air, where an amount of fresh, blowthrough air is based on a valve opening overlap period between the first set of exhaust valves and intake valves of each cylinder, and wherein the combusted exhaust gases from the second set of exhaust valves does not contain fresh, blowthrough air.

12. The method of claim 10, wherein the determined dilution rate of the gases flowing from the first set of exhaust valves to the compressor is a first determined dilution rate, further comprising determining a second dilution rate of gases flowing from the first set of exhaust valves to the compressor based on each of engine speed, engine load, the differential pressure across the flow constriction arranged in the intake passage, and a cam timing of the first set of exhaust valves, and further comprising correcting the second determined dilution rate with the first determined dilution rate to determine a final dilution rate and adjusting one or more of fuel injection to the plurality of engine cylinders and spark timing based on the final determined dilution rate.

13. The method of claim 12, wherein flowing gases from the first set of exhaust valves to the compressor includes flowing a combination of combusted exhaust gases, fresh blow through air, and unburnt fuel from the first set of exhaust valves to the intake passage, upstream of the compressor, via an exhaust gas recirculation (EGR) passage including an EGR valve and wherein the second determined dilution rate is further based on a differential pressure across the EGR valve and the flow constriction.

14. The method of claim 12, wherein adjusting one or more of fuel injection to the plurality of engine cylinders and spark timing based on the determined dilution rate includes actuating one or more fuel injectors to increase an amount of fuel injected into the plurality of engine cylinders in response to the determined dilution rate decreasing.

15. A system for an engine, comprising:
a first set of exhaust valves exclusively coupled to a first exhaust manifold, the first exhaust manifold coupled to an intake passage, upstream of a turbocharger compressor, via an exhaust gas recirculation (EGR) passage, the EGR passage including an EGR valve;
a second set of exhaust valves exclusively coupled to a second exhaust manifold coupled to an exhaust passage, upstream of a turbocharger turbine disposed in the exhaust passage;
a plurality of engine cylinders, each cylinder including one of the first set of exhaust valves and one of the second set of exhaust valves; and
a controller including memory with instructions stored thereon for:
determining a dilution rate of gases flowing from the first set of exhaust valves to the turbocharger compressor via the EGR passage based on a first temperature of gases in the EGR passage, a second temperature of gases in the intake passage, upstream of where the EGR passage couples to the intake passage, and a third temperature of gases in the intake passage, downstream of the turbocharger compressor; and
adjusting spark timing and fuel injection to the plurality of engine cylinders based on the determined dilution rate,
wherein the instructions further include instructions for determining the dilution rate based on engine speed, engine load, a cam timing of the first set of exhaust valves, and a differential pressure across the EGR valve and a flow constriction positioned in the intake passage downstream of where the EGR passage couples to the intake passage.

16. The system of claim 15, wherein the first set of exhaust valves open at a different timing than the second set of exhaust valves and wherein there is a valve overlap period between the first set of exhaust valves and intake valves of the plurality of engine cylinders where one of the first set of exhaust valves and an intake valve of each cylinder are both open while the second set of exhaust valves is closed.

17. The system of claim 15, further comprising a bypass passage coupled between the first exhaust manifold and the exhaust passage, downstream of the turbocharger turbine.

18. The system of claim 15, further comprising a first temperature sensor positioned in the EGR passage, a second temperature sensor positioned in the intake passage, upstream of where the EGR passage couples to the intake passage, and a third temperature sensor positioned in the intake passage, downstream of the turbocharger compressor and wherein a first temperature, a second temperature, and a third temperature are measured temperatures determined from outputs of each of the first temperature sensor, the second temperature sensor, and the third temperature sensor, respectively.

* * * * *